United States Patent
Zeng et al.

(10) Patent No.: US 11,533,770 B2
(45) Date of Patent: *Dec. 20, 2022

(54) TDM TRANSMISSION FOR INTER-RAT DUAL CONNECTIVITY UE

(71) Applicant: Apple Inc., Cupertino, CA (US)

(72) Inventors: Wei Zeng, San Diego, CA (US); Haijing Hu, Beijing (CN); Yuchul Kim, Santa Clara, CA (US); Dawei Zhang, Saratoga, CA (US); Xiangying Yang, Cupertino, CA (US); Zhu Ji, San Jose, CA (US); Yang Li, Plano, TX (US); Beibei Wang, Cupertino, CA (US); Jia Tang, San Jose, CA (US); Sami M. Almalfouh, San Jose, CA (US); Johnson O. Sebeni, Fremont, CA (US); Wei Zhang, Santa Clara, CA (US); Tianyan Pu, Cupertino, CA (US); Vijay Venkataraman, Sunnyvale, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,604

(22) Filed: Mar. 15, 2021

(65) Prior Publication Data
US 2021/0204342 A1    Jul. 1, 2021

Related U.S. Application Data

(63) Continuation of application No. 16/905,636, filed on Jun. 18, 2020, now Pat. No. 10,973,070, which is a
(Continued)

(51) Int. Cl.
*H04W 76/15* (2018.01)
*H04W 88/10* (2009.01)
(Continued)

(52) U.S. Cl.
CPC .......... *H04W 76/15* (2018.02); *H04B 7/2643* (2013.01); *H04W 72/0413* (2013.01);
(Continued)

(58) Field of Classification Search
CPC ............. H04W 76/15; H04W 76/0413; H04W 72/0453; H04W 72/1215; H04W 88/10; H04W 76/28; H04W 88/06; H04B 76/15
(Continued)

(56) References Cited

U.S. PATENT DOCUMENTS 10,284,281 B2   5/2019   Zhuanq
10,485,048 B2   11/2019  Zeng et al.
(Continued)

FOREIGN PATENT DOCUMENTS

WO   2015/000157 A1   1/2015
WO   2016/095078 A1   8/2016

OTHER PUBLICATIONS

Huawei et al., "Overview of NR UL for LTE-NR coexistence", 3GPP TSG RAN WG1 Meeting #89, Hangzhou, China; R1-1709383, 5/15/22017,15 pages.
(Continued)

*Primary Examiner* — Gbemileke J Onamuti
(74) *Attorney, Agent, or Firm* — Kowert, Hood, Munyon, Rankin & Goetzel, P.C.

(57) ABSTRACT

Apparatuses, systems, and methods for a wireless device to perform substantially concurrent communications with a next generation network node and a legacy network node. The wireless device may be configured to stablish a first wireless link with a first cell according to a RAT, where the first cell operates in a first system bandwidth and establish a second wireless link with a second cell according to a RAT, where the second cell operates in a second system bandwidth. Further, the wireless device may be configured to
(Continued)

perform uplink activity for both the first RAT and the second RAT by TDM uplink data for the first RAT and uplink data for the second RAT if uplink activity is scheduled according to both the first RAT and the second RAT.

20 Claims, 17 Drawing Sheets

Related U.S. Application Data continuation of application No. 16/654,239, filed on Oct. 16, 2019, now Pat. No. 10,736,163, which is a continuation of application No. 15/966,541, filed on Apr. 30, 2018, now Pat. No. 10,485,048.

(60) Provisional application No. 62/543,417, filed on Aug. 10, 2017, provisional application No. 62/520,375, filed on Jun. 15, 2017.

(51) Int. Cl.
  *H04W 72/04* (2009.01)
  *H04B 7/26* (2006.01)
  *H04W 72/12* (2009.01)
  *H04W 88/06* (2009.01)
  *H04W 76/28* (2018.01)

(52) U.S. Cl.
  CPC .......... *H04W 72/0453* (2013.01); *H04W 72/1215* (2013.01); *H04W 88/10* (2013.01); *H04W 76/28* (2018.02); *H04W 88/06* (2013.01)

(58) Field of Classification Search
  USPC ........................................ 370/329
  See application file for complete search history.

(56) References Cited

U.S. PATENT DOCUMENTS

| | | | |
|---|---|---|---|
| 2014/0092787 A1 | 4/2014 | Han | |
| 2014/0286170 A1* | 9/2014 | Ericson | H04W 36/22 370/235 |
| 2015/0223212 A1 | 8/2015 | Der Velde | |
| 2015/0319643 A1 | 11/2015 | Zhu | |
| 2016/0021592 A1 | 1/2016 | Vesely | |
| 2016/0044540 A1 | 2/2016 | He | |
| 2016/0211948 A1 | 7/2016 | Tiirola | |
| 2016/0255665 A1 | 9/2016 | Futaki | |
| 2017/0171856 A1 | 6/2017 | Zeng | |
| 2017/0303182 A1 | 10/2017 | Uchino | |
| 2019/0059052 A1 | 2/2019 | Nord | |
| 2019/0109697 A1 | 4/2019 | Lee | |

OTHER PUBLICATIONS

Intel Corporation, "NR-LTE coexistence in UL", 3GPP TSG RAN WG1 Meeting #88; R1-1702714, Athens, Greece; Feb. 13, 2017, 3 pages.
Huawei et al., "Considerations of NR UL operation", 3GPP TSG RAN WG1 Meeting #88; R1-1701668; Athens, Greece; Feb. 13, 2017; 5 pages.
Extended European Search Report for Application No. 18174757. 7-1231; dated Oct. 16, 2018; 13 pages.
Apple Inc., "Uplink sharing in NSA mode"; 3GPP TSG RAN WG1 #89; R1-1708276; May 19, 2017; 7 pages.
ZTE, et al.; "Discussion on NR-LTE Co-existence"; 3GPP TSG RAN WG1 #88; R1-1701618; Feb. 17, 2017; 11 pages.
Catt, "Support of UL earner sharing between NR-LTE"; 3GPP TSG RAN WG1 #89; R1-1707528; May 19, 2017; 3 pages.
Samsung, "UE capability coordination in case of IRAT DC"; 3GPP TSG-RAN WG2 #95; R2-165044; Aug. 22, 2016; 6 pages.
Apple Inc., "UE capability indication for single UL transmission of LTE-NR DC"; 3GPP TSG RAN WG2 #99; R2-1709700; Berlin Germany; Aug. 25, 2017; 3 pages.
Apple Inc., "On UE TDM uplink transmission in NR NSA mode"; 3GPP TSG RAN WG1 #90; R1-1714089; Aug. 25, 2017; 7 pages.
Office Action for Japanese Patent Application No. 2018-114593, dated May 27, 2019; 8 pages.
NTT Docomo, Inc., "LTE-NR co-existence for uplink", 3GPP TSG RAN WG1 AH NR Meeting; R1-1700631;Spokane, USA; Feb. 16, 2017; 2 pages.
Vodafone Group Plc, et al., "Uplink operation for LTE+NR Dual Connectivity"; 3GPP TSG RAN WG1 NR AH Meeting; R1-1701198; Spokane, USA; Feb. 16, 2017; 4 pages.
LG Electronics, "Discussion on dual connectivity between LTE and NR"; 3GPP TSG RAN WG1 Meeting #88bis; R1-1704924; Spokane, USA; Apr. 3, 2017; 3 pages.
Notice of Allowance for Korean Patent Application No. 10-2018-0066572, dated Oct. 2, 2019; 6 pages.
Vodafone Group Plc, "Uplink Operation for LTE+NR Dual Connectivity" 3GPP TSG RAN WG1 Meeting #87 R1-1612887, Reno, USA; Nov. 14, 2016; 3 pages.
Huawei et al., "Detailed considerations on UL power control design for NR"; 3GPP TSG RAN WG1 Meeting #88, R1-1701688, Athens Greece, Feb. 13, 2017; 4 pages.

\* cited by examiner

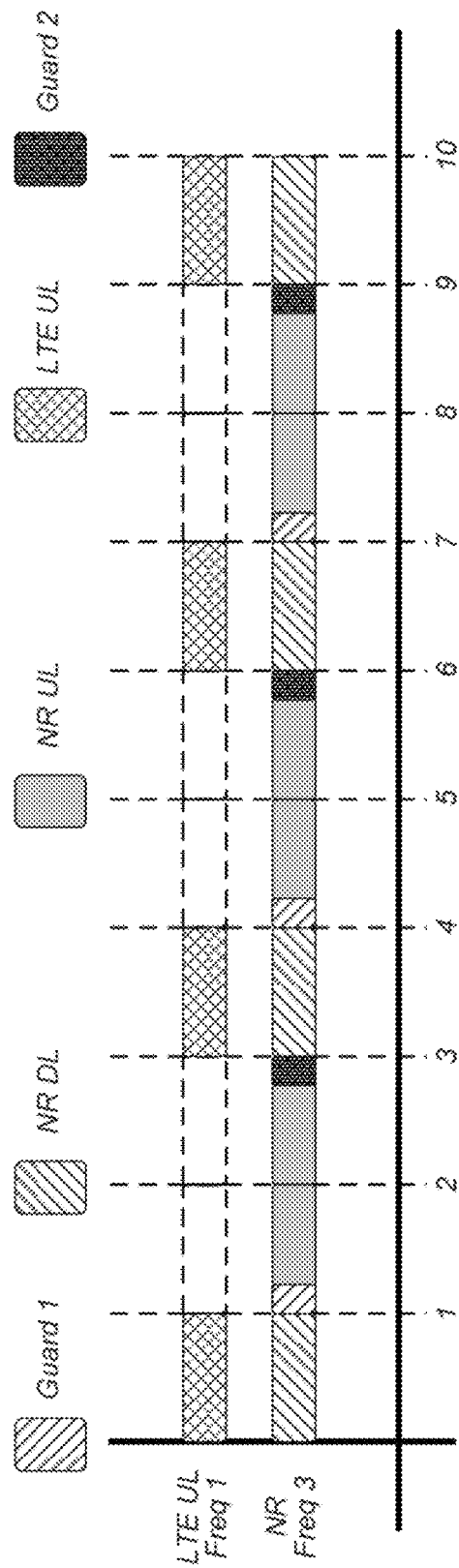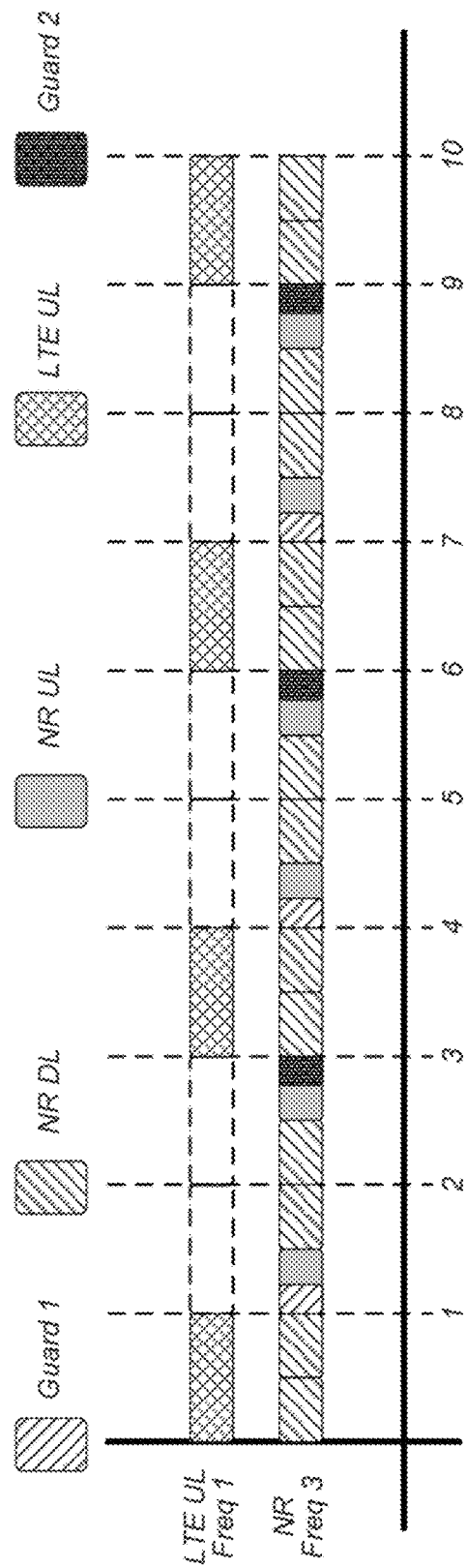

TDM TRANSMISSION FOR INTER-RAT DUAL CONNECTIVITY UE

PRIORITY DATA

This application is a continuation of U.S. patent application Ser. No. 16/905,636, titled "TDM Transmission for Inter-RAT Dual Connectivity UE", filed Jun. 18, 2020, which is a continuation of U.S. patent application Ser. No. 16/654,239, titled "TDM Transmission for Inter-RAT Dual Connectivity UE", filed Oct. 16, 2019, which is a continuation of U.S. patent application Ser. No. 15/966,541, titled "TDM Transmission for Inter-RAT Dual Connectivity UE", filed Apr. 30, 2018, which claims benefit of priority to U.S. Provisional Application Ser. No. 62/520,375, titled "TDM Transmission for Inter-RAT Dual Connectivity UE", filed Jun. 15, 2017, and to U.S. Provisional Application Ser. No. 62/543,417, titled "TDM Transmission for Inter-RAT Dual Connectivity UE", filed Aug. 10, 2017, which are hereby incorporated by reference in their entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform attachment of a wireless device to concurrent (or substantially concurrent) connections with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first radio access technology (RAT) and the second radio may be configured to perform cellular communication according to a second RAT.

In some embodiments, a wireless device may be configured to perform methods to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the wireless device may be configured to determine whether the wireless device has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In other words, the wireless device may not simultaneously transmit on the first RAT and the second RAT. Said another way, the wireless device may not be configured to transmit on the first RAT and the second RAT simultaneously. Thus, at least in some embodiments, the wireless device, may not be capable of supporting (and/or performing) simultaneous transmissions on the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the wireless device may be configured to receive an allocation of a first UL subframe for transmissions according to the first RAT and an allocation of a second UL subframe for transmissions according to the second RAT. In some embodiments, the TDM of the uplink data may be performed at a physical layer of the wireless device. In some embodiments, the wireless device may be further configured to receive an allocation of a portion of each UL subframe for control signaling according to one of the first or second RATs.

In some embodiments, a wireless device may be configured to perform methods to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the wireless device may be configured to determine that the wireless device has uplink activity scheduled according to both the first RAT and the second RAT and transmit a message indicating whether the wireless device requires a retuning period and/or radio frequency (RF) switching gap (e.g., to switch from a communication frequency of the first RAT to a communication frequency of the second RAT). In some embodiments, the retuning period and/or RF switching gap may be transmitted in a capabilities message. In some embodiments, the wireless device may be configured to receive sub-frame allocations for the first and second RATs based (at least in part) on transmitted indication.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 16A-B illustrate example uplink patterns for NR-LTE dual connectivity, according to some embodiments.

Figure 1:
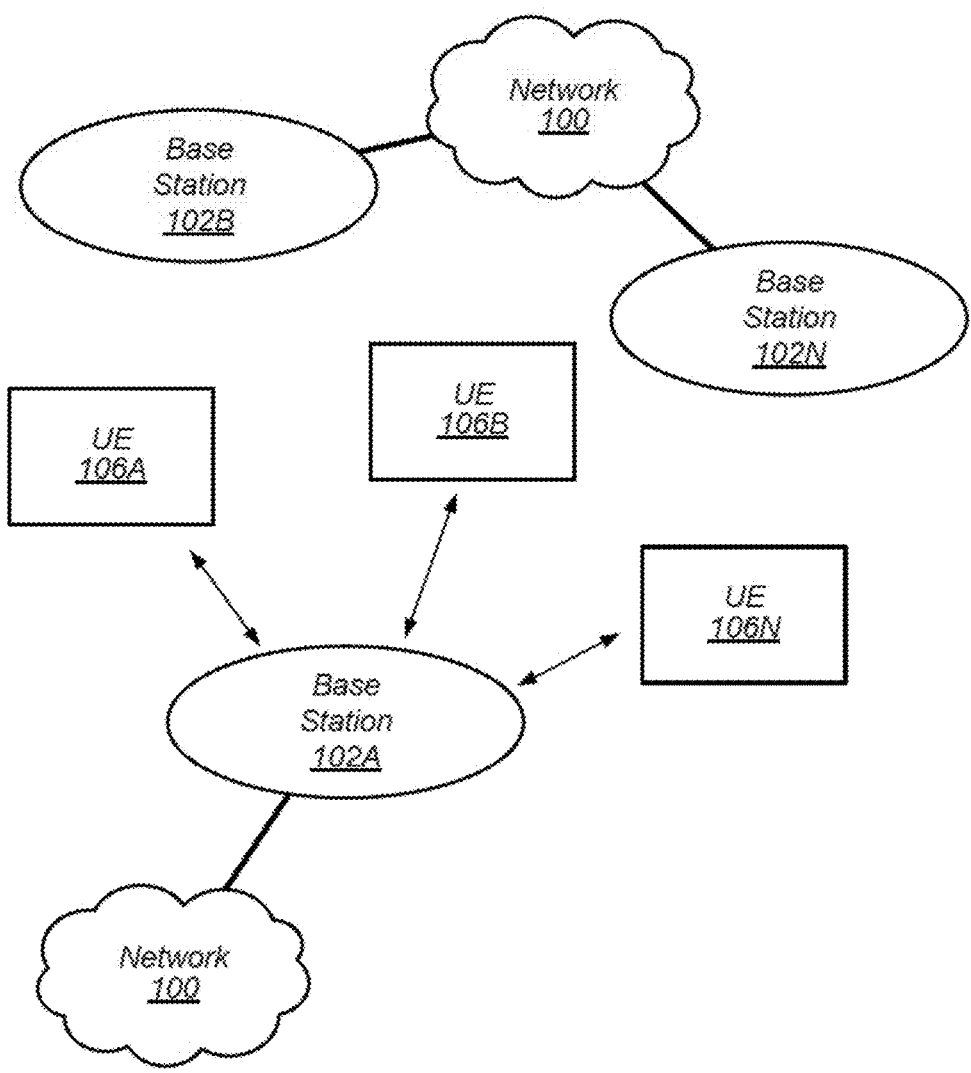
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
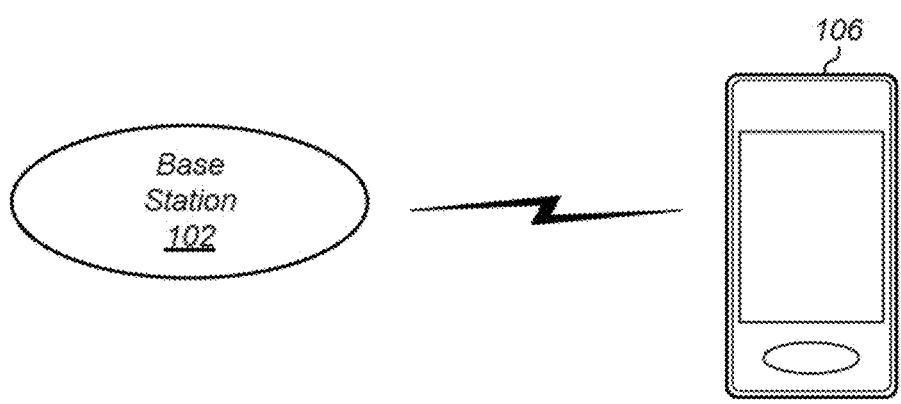
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
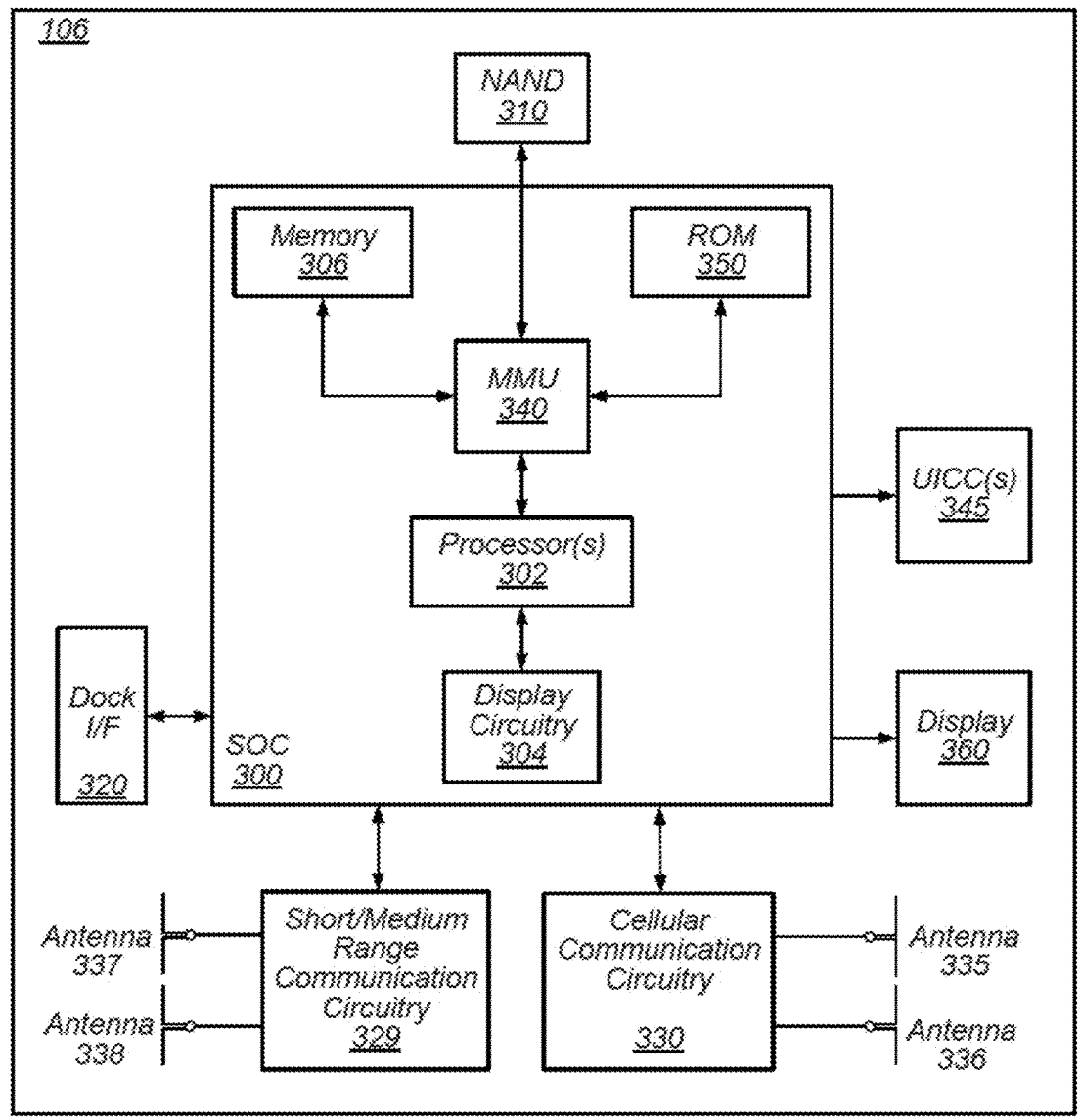
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
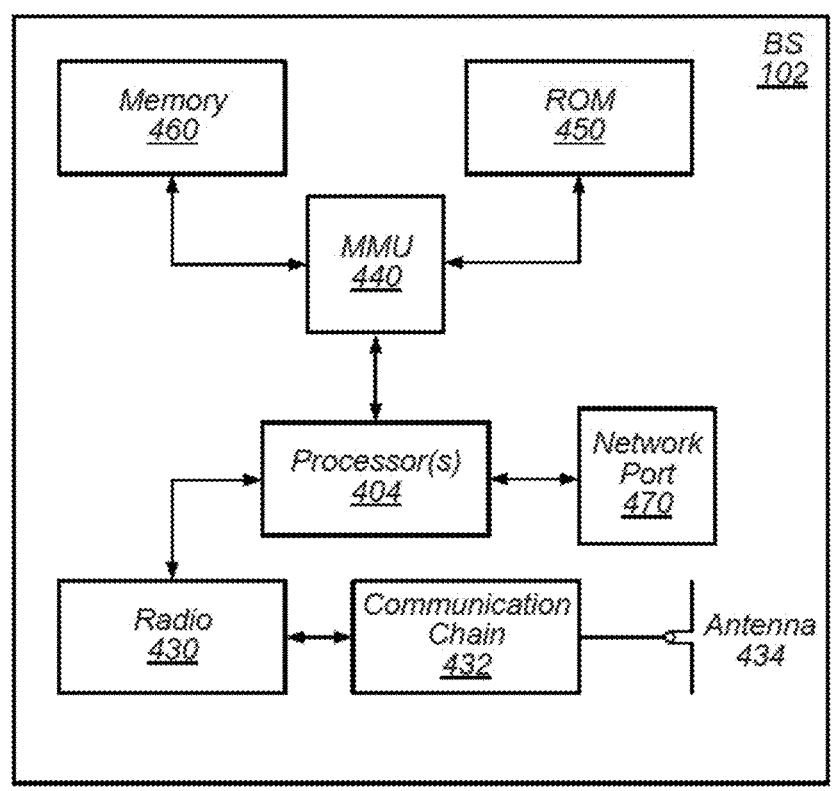
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
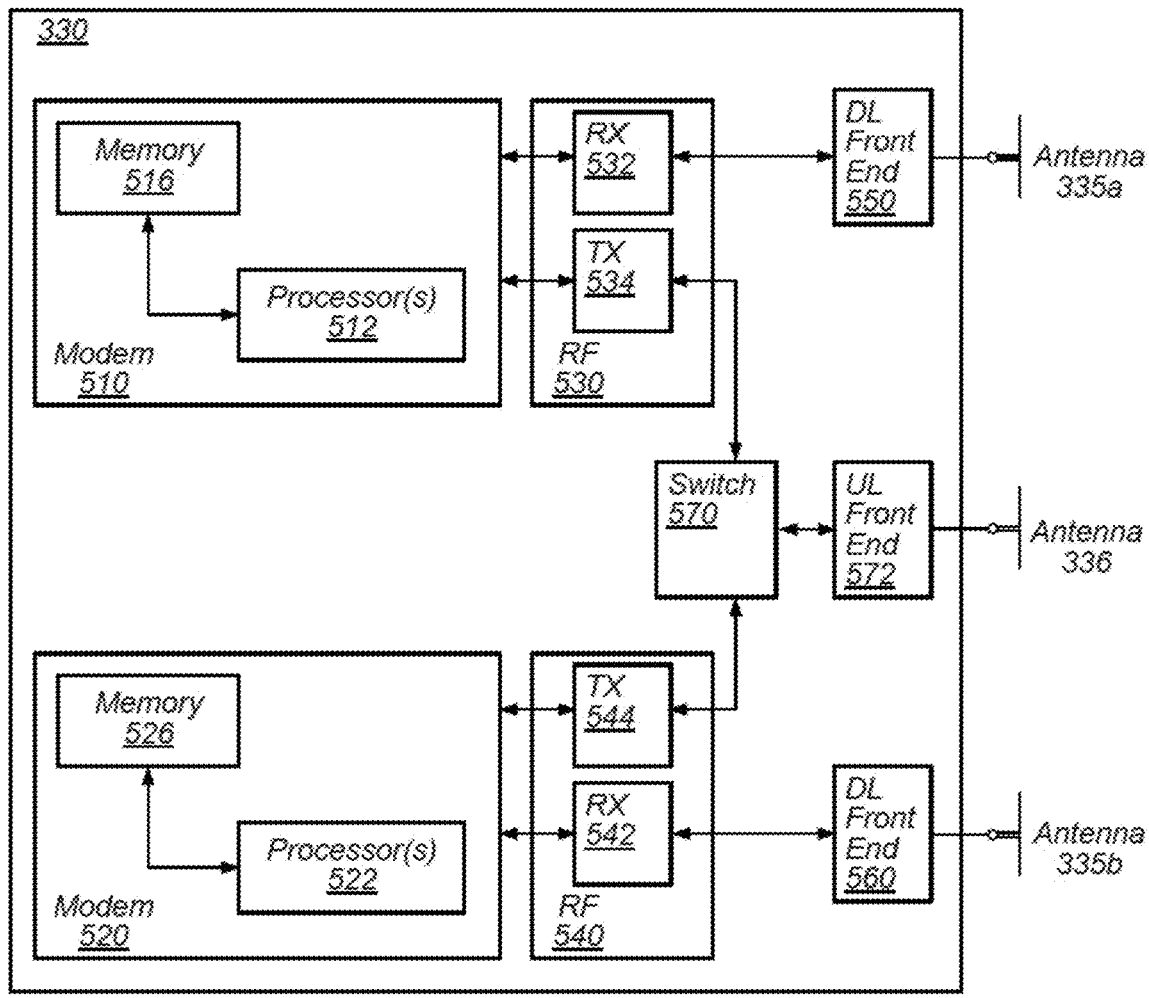
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-Standalone (NSA) Operation with LTE

Figure 6A:
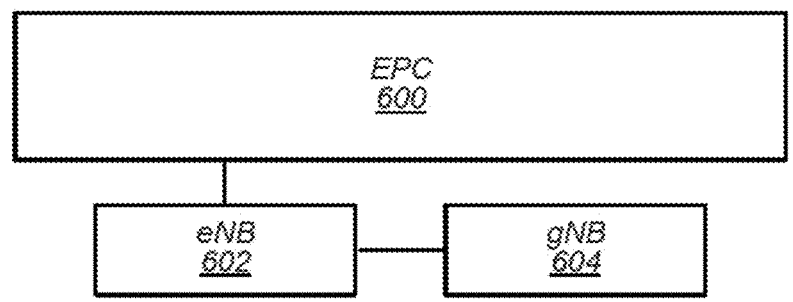
FIG. 6A illustrates an example of connections between an EPC network, an LTE base station (eNB), and a 5G NR base station (gNB).
Figure 6B:
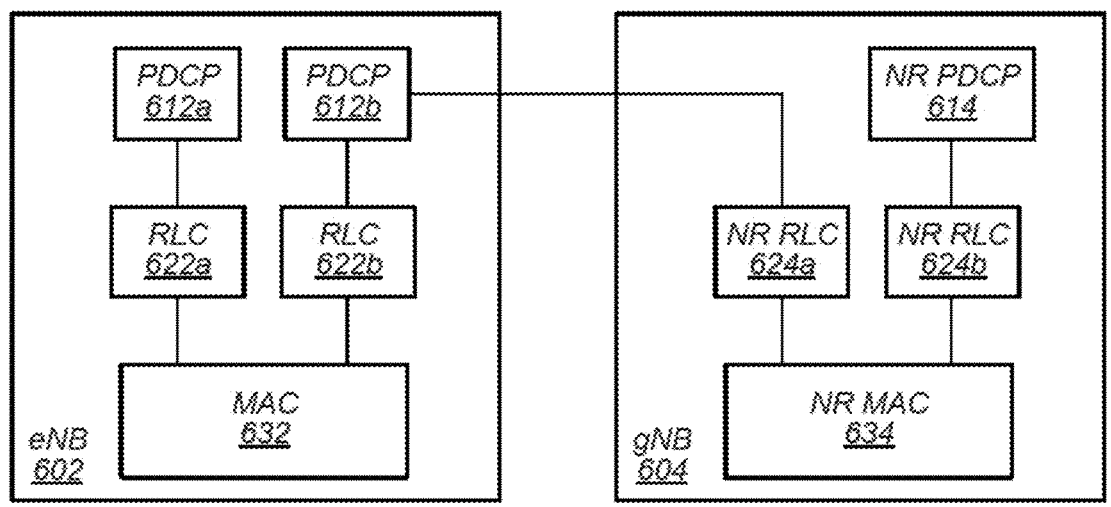
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA.

Capability Indication for NR NSA Operation

In some embodiments, a UE, such as communication device 106, may support LTE and NR co-existence on specific bands and/or frequencies. In addition, a UE may determine that for a band combination, UL sharing in NSA mode may be required to avoid receiver sensitivity degradation. Thus, the UE may need to inform the network that UL sharing mode will be used for the LTE/NR band combination. In some embodiments, a conditional field may be added to a UE capability message. The conditional field may indicate whether UL sharing mode will be used for the allocated band combination. In addition, the conditional field may indicate which bands/frequencies that the UE supports NSA operations. Note further that in some embodiments, e.g., as further described below, the UE may be configured to perform NSA operations via time division multiplexing (TDM). However, in other embodiments, the UE may be configured to perform NSA operations via other mechanisms such as frequency division multiplexing (FDM) or MAC layer multiplexing.

TDM Transmission for Inter-RAT Dual Connectivity

In some embodiments, a UE, such as communication device 106, may use a single UL RF chain for 5G NR and LTE bands, e.g., via cellular communication circuitry 330 as illustrated by FIG. 5 above. In some embodiments, the UE may support two downlink RF chains for concurrent (or substantially concurrent) DL operations in 5G NR and LTE, e.g., via cellular communication circuitry 330 as illustrated by FIG. 5 above. In some embodiments, an LTE cell, such as eNB 602, may not support LTE/NR co-existence on the same carrier, thus, time division multiplexing (TDM) may occur on different frequencies. In some embodiments, an LTE cell, such as eNB 602, may support LTE/NR co-existence on the same carrier, thus TDM may occur on the same frequencies. In some embodiments, TDM for UL transmissions may occur at a physical layer of a protocol stack.

Figure 7:
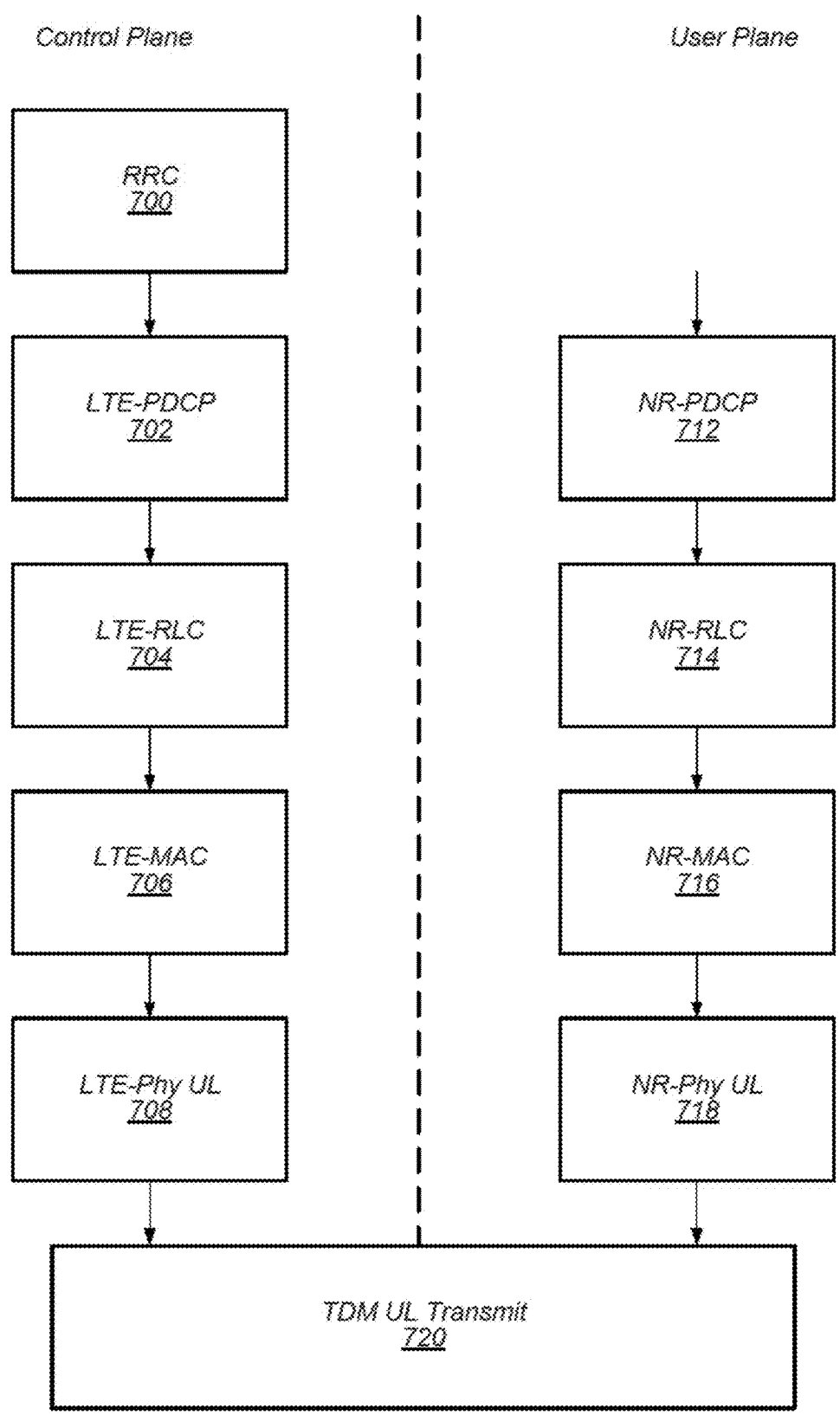
FIG. 7 illustrates an example of control and user planes, according to some embodiments.

For example, FIG. 7 illustrates an example of an LTE control plane and an NR user plane for TDM for UL transmissions, according to some embodiments. As shown, in some embodiments, a control plane may include a radio resource control (RRC) layer 700, an LTE packet data convergence protocol (PDCP) layer 702, an LTE radio link control (RLC) layer 704, and LTE medium access control (MAC) layer 706, and an LTE physical uplink (Phy UL) layer 708. In addition, a user plane may include an NR-PDCP layer 712, and NR-RLC layer 714, and NR-MAC layer 716, and a NR-Phy UL layer 718. Thus, LTE may be used for control and/or connection signaling (e.g., via RRC layer 700) as well as data signaling whereas NR may be used for data signaling. In some embodiments, the UL data subframes, e.g., as further described below, may be time division multiplexed (TDM) at the UL physical layer, e.g., as shown by TDM UL transmit 720. In some embodiments, if an LTE cell (or base station) does not support LTE/NR co-existence on a single carrier, the TDM at the UL physical layer may be on different frequencies. In some embodiments, if an LTE cell (or base station) does support LTE/NR co-existence on a single carrier, the TDM at the UL physical layer may be on the same frequency.

Figure 8:
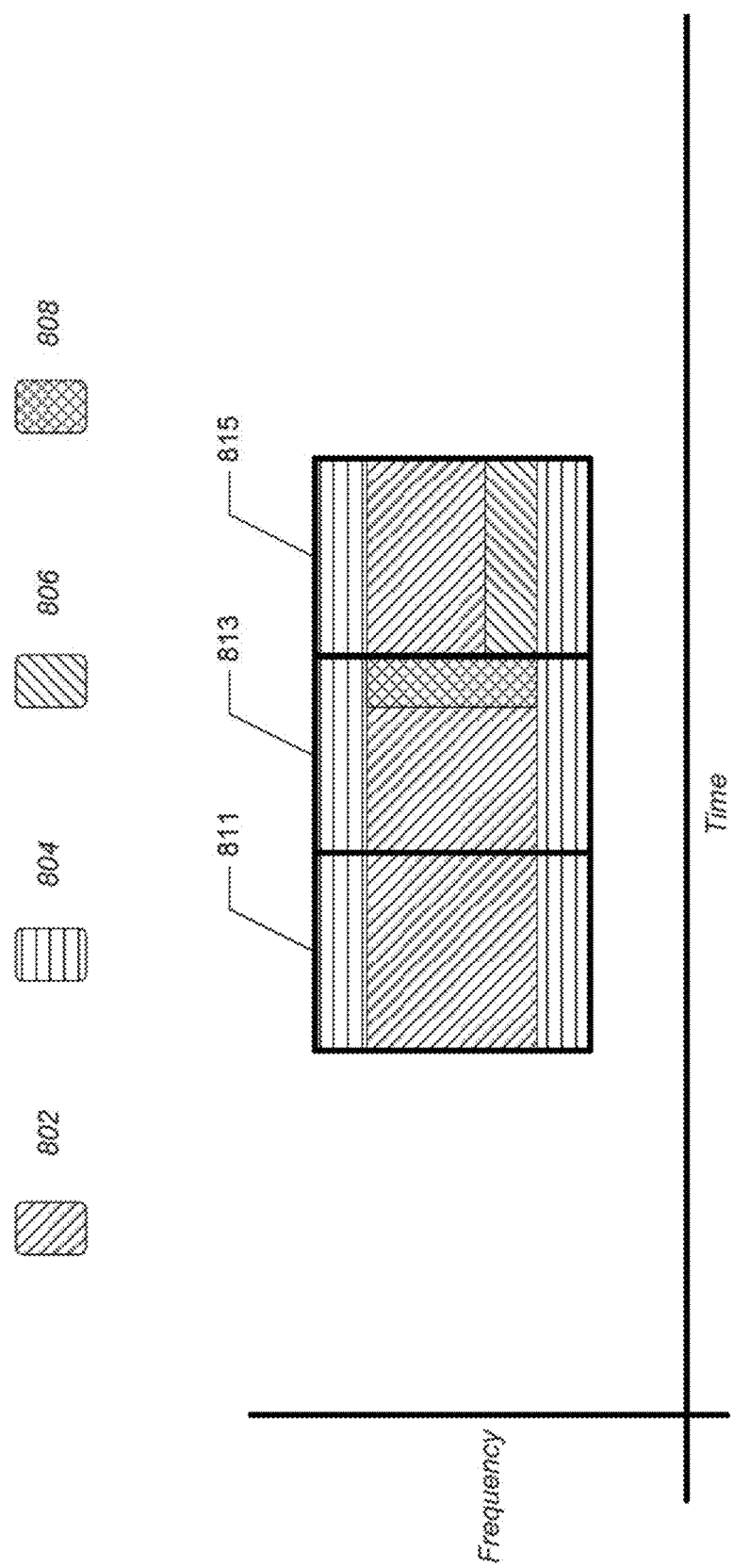
FIG. 8 illustrates example allocations exchanged between an eNB and a gNB over an X2 interface for TDM for NR NSA operation, according to some embodiments.

As noted above, an X2 interface may allow for communication between an LTE base station, e.g. such as eNB 602, and a 5G NR base station, e.g., such as gNB 604. In particular, in some embodiments, the X2 may allow for the LTE-PDCP layer 702 of the control plane to exchange communications with the NR-RLC layer 714 of the user plane. In some embodiments, synchronization (e.g., allocation of subframes) between an LTE base station and a NR base station may be enabled via the X2 interface. Note that these allocations, which may be semi-static resource allocations, may be exchanged to coordinate the eNB and gNB. For example, in LTE, certain UL resources are semi-statically reserved and/or configured, including sounding reference signals (SRS), physical uplink control channel (PUCCH), and physical random access channel (PRACH), among other channels and resources. In addition, a similar semi-static allocation approach may be adopted for NR. Thus, to avoid conflicting usage of the semi-statically reserved resources, the eNB and gNB may exchange configurations via the X2 interface. For example, FIG. 8 illustrates example possible subframe allocations negotiated between an eNB and a gNB over an X2 interface for TDM for NR NSA operation, according to some embodiments. As shown, a subframe 811 may include, for example, one or more frequency bands reserved for LTE physical uplink control channel (PUCCH) 804 and a frequency band reserved for NR data transmissions 802. Note that the frequency bands may be reserved for the entire portion of the first subframe 811. As an additional example, a subframe 813 may include one or more frequency bands reserved for LTE PUCCH 804 as well as a frequency band reserved for both NR data transmissions 802 and LTE sounding reference signal (SRS) 808. Note that a first portion of the subframe may be reserved for NR data transmissions 802 and a second portion of the subframe may be reserved for LTE SRS 808 on the frequency band. In other words, the NR data transmissions 802 and the LTE SRS 808 may be allocated the same frequency band and scheduled within the same subframe, but at differing times within the subframe. As a further example, a subframe 815 may include one or more frequency bands reserved for LTE PUCCH 804 as well as a frequency band reserved for NR data transmissions 802 and a frequency band reserved for LTE physical random access channel (PRACH) 806.

In some embodiments, a semi-static reservation of uplink slots for LTE and NR may simplify a scheduler for both an eNB and a gNB. Thus, time domain resources for each RAT's UL may be semi-statically configured. In some embodiments, the configuration may be on a per-UE basis in an RRC re-configuration. For example, for a NSA UE, uplink slots 0, 2, 4, 6, 8 may be reserved for LTE uplink and slots 1, 3, 5, 7, 9 may be reserved for NR uplink. Note that in some embodiments, inter-RAT DC UE's may share a (common) configuration. Note further, that in some embodiments, data for a slot/sub-frame may be dynamically scheduled. For example, for a NSA mode UE, in each LTE uplink slot, whether PUSCH is scheduled or not, which resource blocks are scheduled for LTE PUSCH may be dynamically scheduled by a legacy LTE scheduler.

Figure 9:
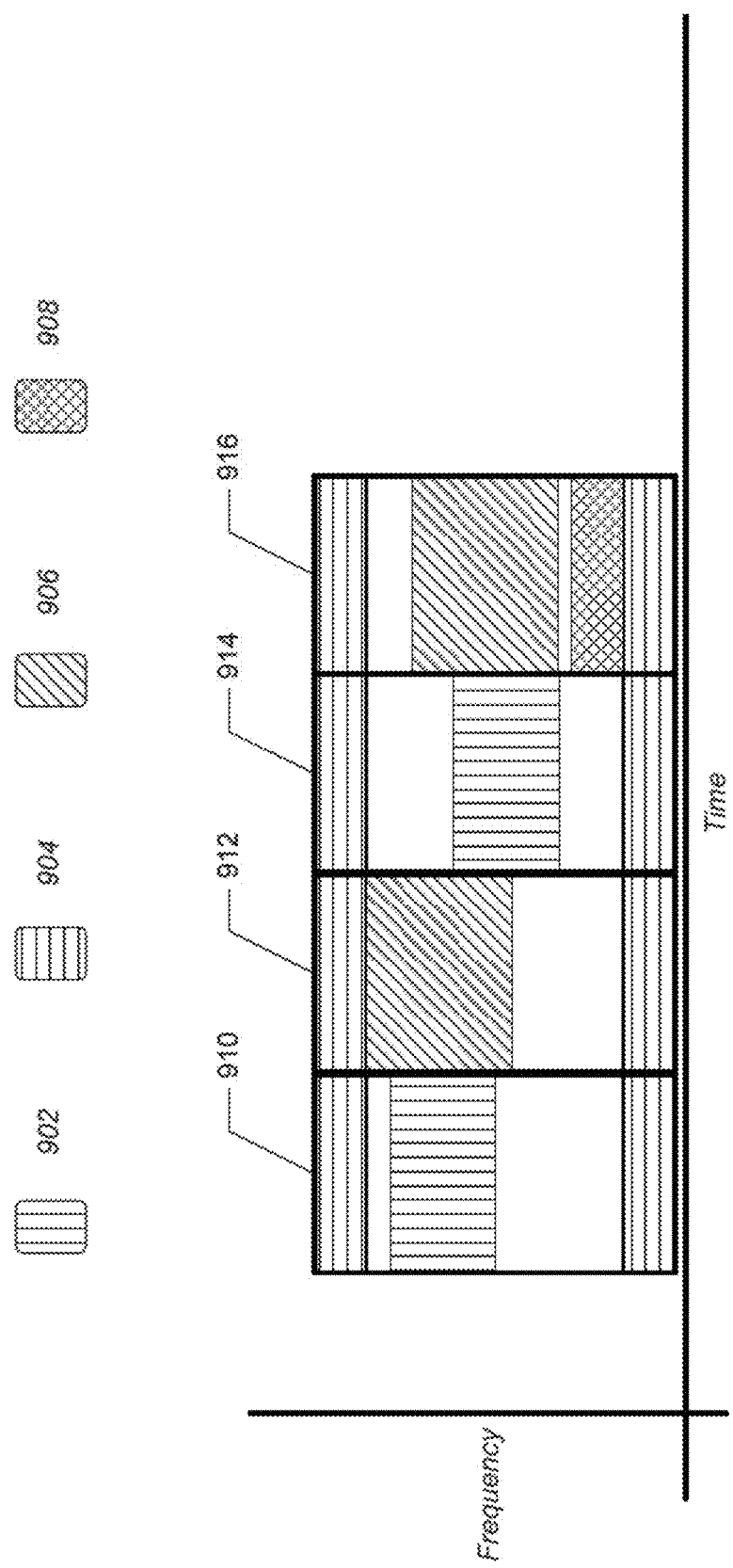
FIG. 9 illustrates an example sequence of subframes for TDM for NR NSA operation, according to some embodiments.

FIG. 9 illustrates an example semi-static reservation of subframes for TDM for NR NSA operation, according to some embodiments. As shown, one or more frequency bands may be scheduled (or allocated) for a first UE's LTE PUCCH 904 in subframes 910, 912, 914, and 916. In addition, a frequency band in subframes 910 and 914 may be scheduled (or allocated) for a second UE's LTE uplink 902. Similarly, a frequency band in subframes 912 and 916 may be scheduled (or allocated) for the second UE's NR uplink 906. Further, a frequency band may be scheduled (or allocated) for LTE PRACH 908 in subframe 916.

Figure 10:
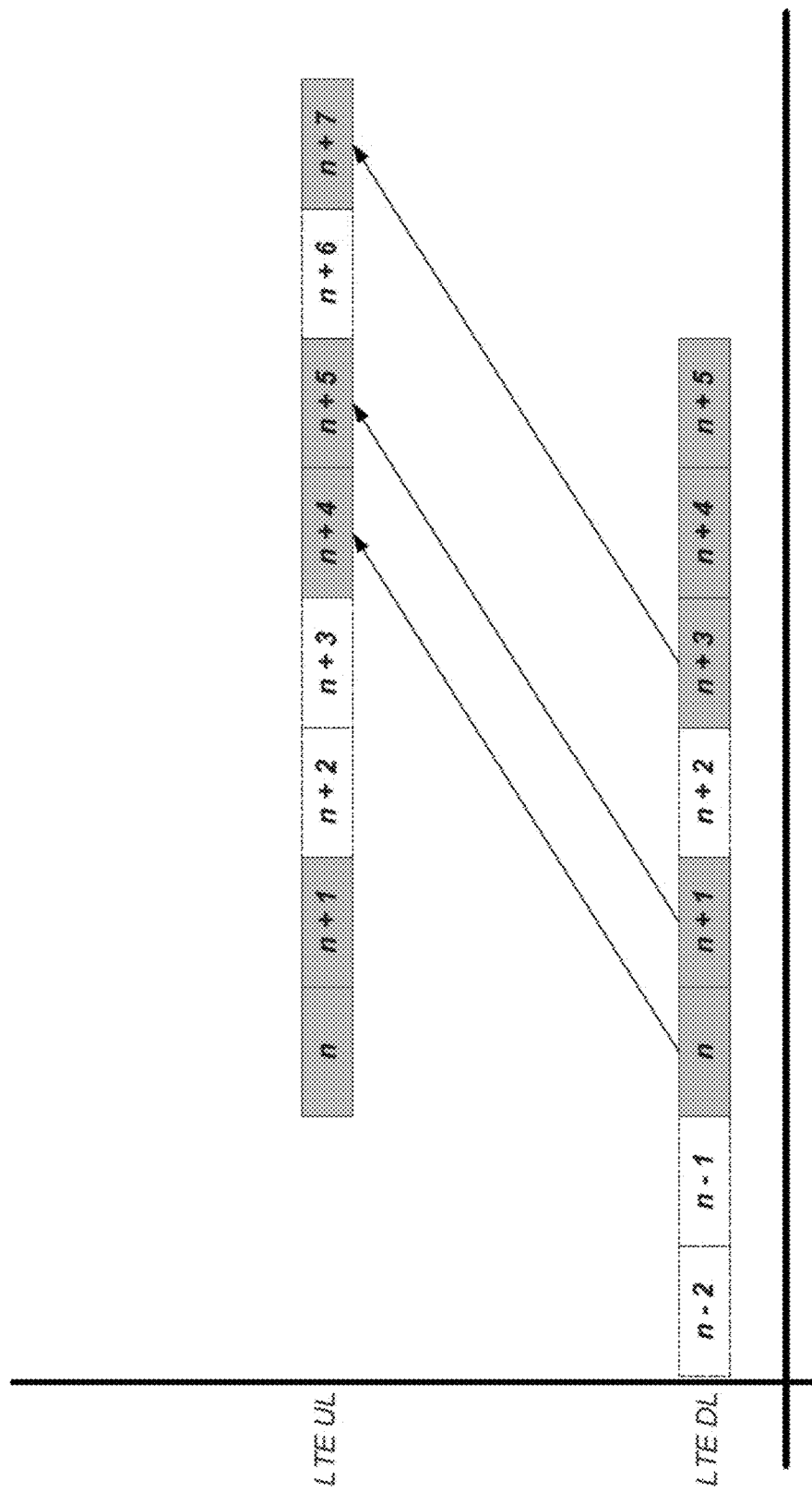
FIG. 10 illustrates an example acknowledgement timeline for TDM for NR NSA operation, according to some embodiments.

However, separately reserved resources for UL may impact the current LTE downlink. For example, frequency division duplexing (FDD) assumes an acknowledgement delay of four subframes. Thus, in some embodiments, TDM of uplink subframes may correspond to muting of certain downlink subframes. For example, based on the semi-static configuration illustrated in FIG. 9, an eNB scheduler and/or a UE may know which downlink subframes to skip. For example, FIG. 10 illustrates an example LTE acknowledgement timeline for TDM for NR NSA operation, according to some embodiments. As shown, DL subframe n may be acknowledged (ACK) 4 subframes later at UL subframe n+4. Similarly, DL subframe n+1 may be acknowledged at UL subframe n+5. However, since subframe n+6 may be scheduled for NR transmissions, DL subframe n+2 may be skipped or muted by either of an eNB scheduler, the UE, or both.

Figure 11:
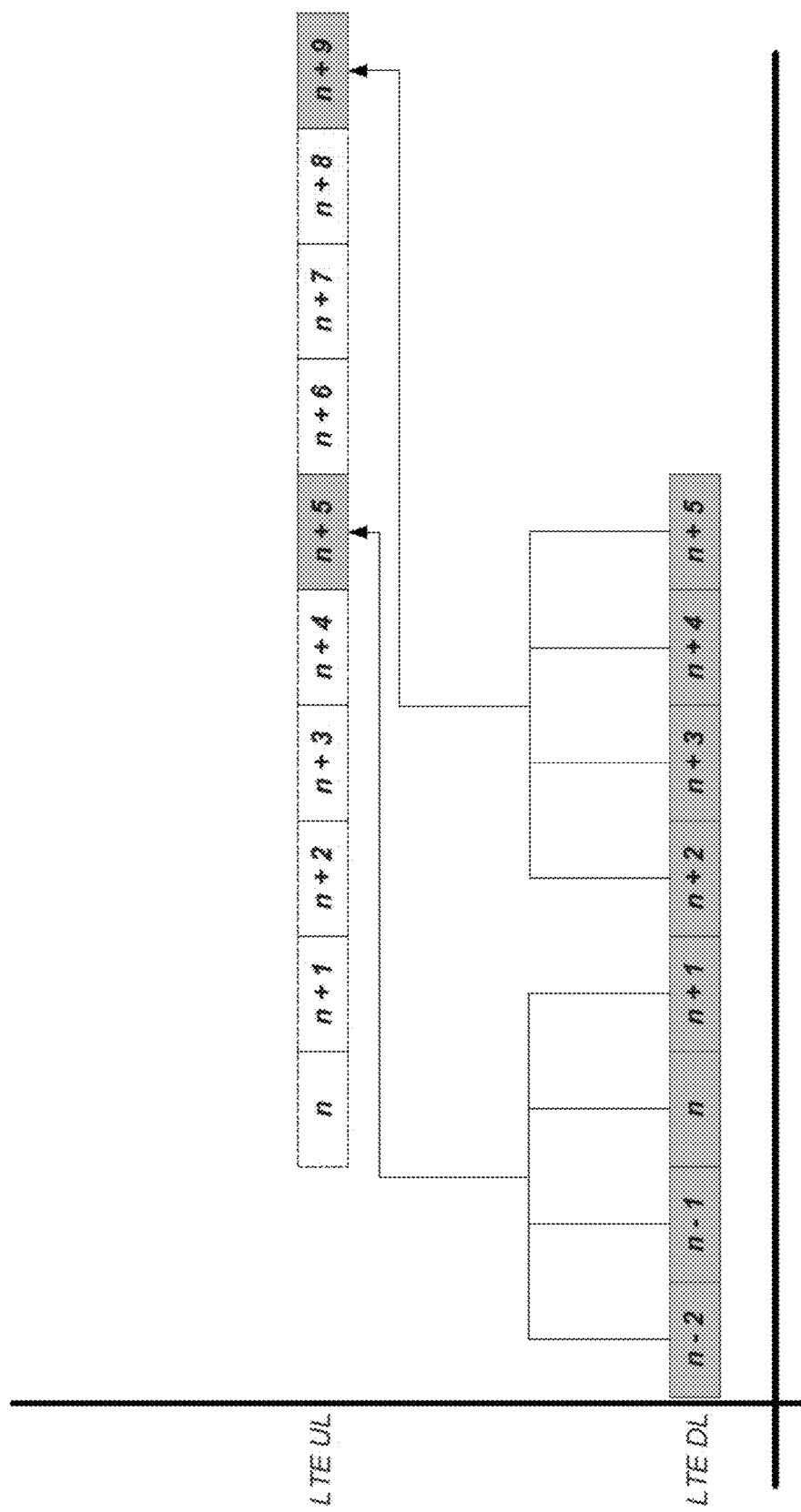
FIG. 11 illustrates an example bundled acknowledgement timeline for TDM for NR NSA operation, according to some embodiments.

Alternatively, in some embodiments, to alleviate potential constraints on LTE DL resources due to LTE DL subframe muting (or skipping), ACK multiplexing (or ACK bundling) may be used. Note that ACK multiplexing/bundling is already supported in LTE time division duplexing (TDD). Thus, in such embodiments, an eNB may configure a DL/UL pattern for inter-RAT UEs to be similar to (or the same as) as one of the LTE TDD frame structures already standardized. For example, FIG. 11 illustrates an example bundled acknowledgement LTE timeline for TDM for NR NSA operation, according to some embodiments. As shown, LTE DL subframe acknowledgments for subframes n−2 through n+1 may be bundled (or multiplexed) and acknowledged at LTE UL subframe n+5. Similarly, LTE DL subframe acknowledgments for subframes n+2 through n+5 may be bundled (or multiplexed) and acknowledged at LTE UL subframe n+9.

As noted above, a UE may acknowledge reception (ACK) or non-reception (NACK) of subframes from a base station a specified number of UL subframes later. For example, for LTE communications, a subframe received from an eNB is typically acknowledged (either ACK or NACK) four subframes after receipt. However, as further noted above, a UE operating in NR NSA mode may be unable to meet the LTE timeline for ACK/NACK. Thus, in some embodiments, LTE ACK/NACKs and NR ACK/NACKs may be multiplexed on an NR PUCCH. For example, an NR PUCCH format similar to LTE PUCCH type 3 may be defined and ACK/NACKs from LTE may be taken as from other NR carriers. As another example, a field in a NR PUCCH format may be reserved for an LTE ACK/NACK payload. In some embodiments, LTE ACK/NACKs and NR ACK/NACKs may be multiplexed on an LTE PUCCH. For example, ACK/NACK from NR may be taken as from other LTE carriers and multiplexed with LTE ACK/NACK. In some embodiments, the NR ACK/NACK multiplexed with the LTE ACK/NACK may be transmitted using one of LTE PUCCH format 3, 4, or 5.

In some embodiments, LTE ACK/NACKs from multiple subframes may be multiplexed as from different LTE carriers and transmitted using LTE PUCCH format 3, 4, or 5. Note that format selection may be based on a number (or size) of pending DL ACK/NACKs. In some embodiments, ACK/NACKs from multiple subframes may be bundled (e.g., via an AND operation between different DL subframes) and transmitted using LTE PUCCH format 3, 4, or 5. In some embodiments, the bundling may be a result of a lack of LTE PUCCH resources to multiplex the DL ACK/NACKs from the multiple subframes. Note that in some embodiments, mapping of ACK/NACK bits between the RATs (e.g., LTE and NR) and subframes may be determined via RRC signaling between the UE and the eNB/gNB.

In some embodiments, for LTE aperiodic channel state information (CSI) reporting (e.g., reporting of channel quality index (CQI), precoding matrix indicators (PMI), and rank indicator (RI)) in TDM, an eNB may only request aperiodic CSI reports in a DL subframe with an associated LTE UL subframe. In other words, the eNB may only request an aperiodic CSI report in a DL subframe that corresponds to a subframe in which the UE will be transmitting in LTE (e.g., an LTE subframe). Said another way, the eNB may not request an aperiodic CSI report in a DL subframe that corresponds to a subframe in which the UE will be transmitting in NR (e.g., an NR subframe). Alternatively, in some embodiments, if an eNB requests an aperiodic CSI report in a DL subframe that correspond to an NR subframe, the UE may multiplex the LTE aperiodic CSI report due in the NR subframe with an NR control payload transmitted in an NR PUCCH or NR PUSCH. As a further alternative, in some embodiments, if an eNB requests an aperiodic CSI report in a DL subframe that correspond to an NR subframe, the UE may delay the aperiodic CSI report to a subsequent LTE subframe. In some embodiments, a dedicated region for LTE PUCCH may be reserved in NR PUCCH.

In some embodiments, for LTE periodic CSI reporting in TDM, an eNB may schedule periodic CSI reporting in LTE subframes and may restrict LTE periodic CSI reports to integral times of TDM patter periodicity (e.g., 10 milliseconds). For example, for LTE FDD, a configuration with a periodicity of 10, 20, 40, 80, or 160 milliseconds may be selected. Alternatively, in some embodiments, for LTE periodic CSI reporting in TDM, an eNB may schedule periodic CSI reporting in any subframe and the UE may multiplex LTE periodic CSI reports due in NR subframes with an NR control payload transmitted in an NR PUCCH or NR PUSCH. In some embodiments, a dedicated region for LTE PUCCH may be reserved in NR PUCCH.

In some embodiments, for an LTE scheduling request (SR), an eNB may only acknowledge SRs received in LTE subframes and may further restrict SR periodicity to be integral times of TDM pattern periodicity (e.g., 10 milliseconds). For example, for LTE FDD, a configuration with a periodicity of 10, 20, 40, or 80 milliseconds may be selected. Alternatively, in some embodiments, a UE may transmit an LTE SR in either LTE or NR subframes. In such embodiments, for NR subframe transmission of an LTE SR, the UE may multiplex the LTE SR with an NR control payload transmitted in an NR PUCCH or NR PUSCH.

Figure 12:
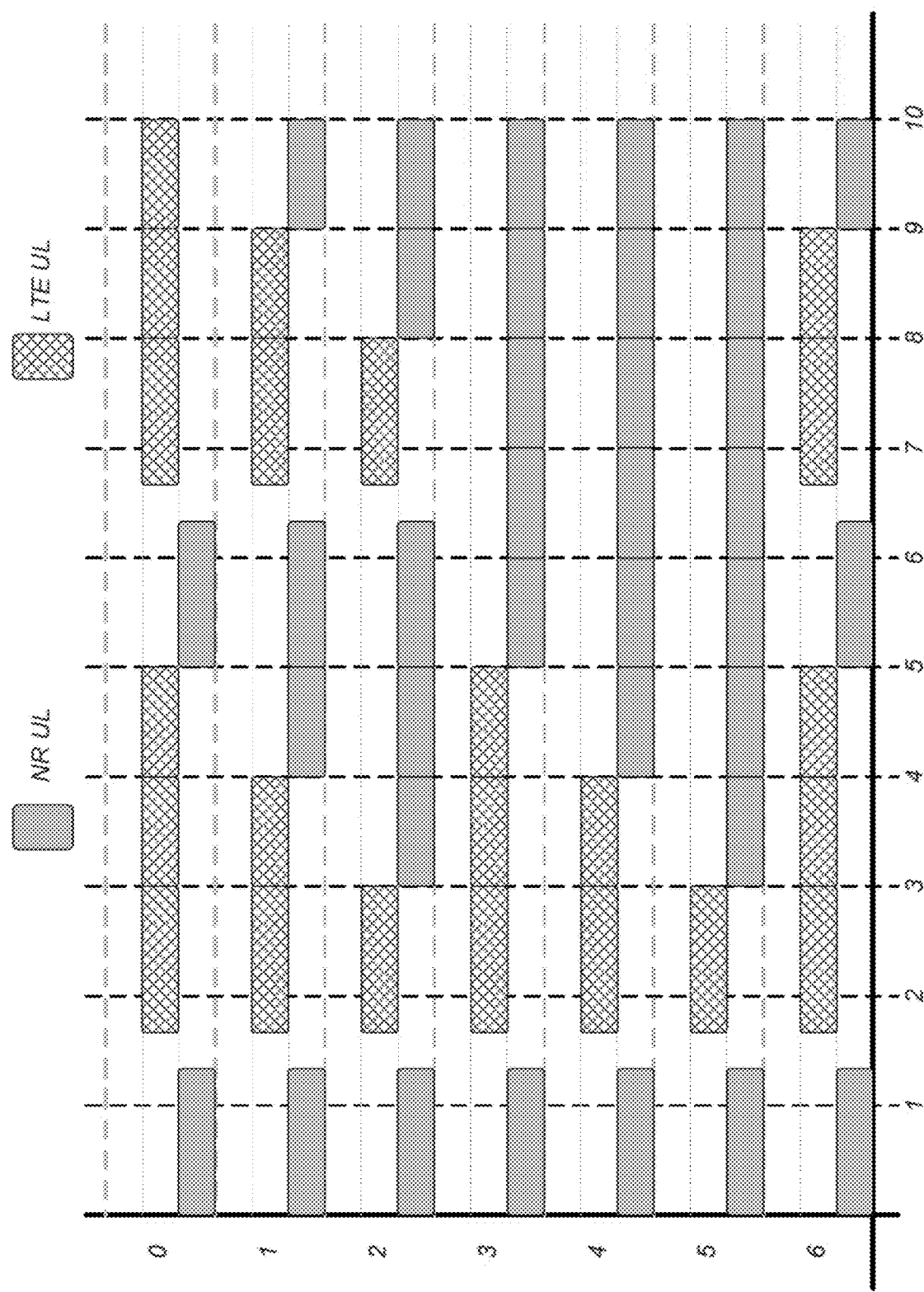
FIG. 12 illustrates an example of various LTE TDD configurations modified for TDM for NR NSA operation, according to some embodiments.

As noted, LTE TDD frame structures may be used for scheduling UEs supporting NR NSA operation, in some embodiments. In such embodiments, LTE DL schedules according to LTE TDD frame structures may be used to transmit NR UL. In addition, TDD mechanisms for hybrid automatic repeat request (HARD) as well as ACK feedback designed for LTE may be reused. FIG. 12 illustrates an example of various LTE TDD configurations modified for TDM for NR NSA operation, according to some embodiments. As shown, originally scheduled LTE DL transmissions may be scheduled as NR UL transmissions for each of the seven LTE TDD configurations.

Figure 13:
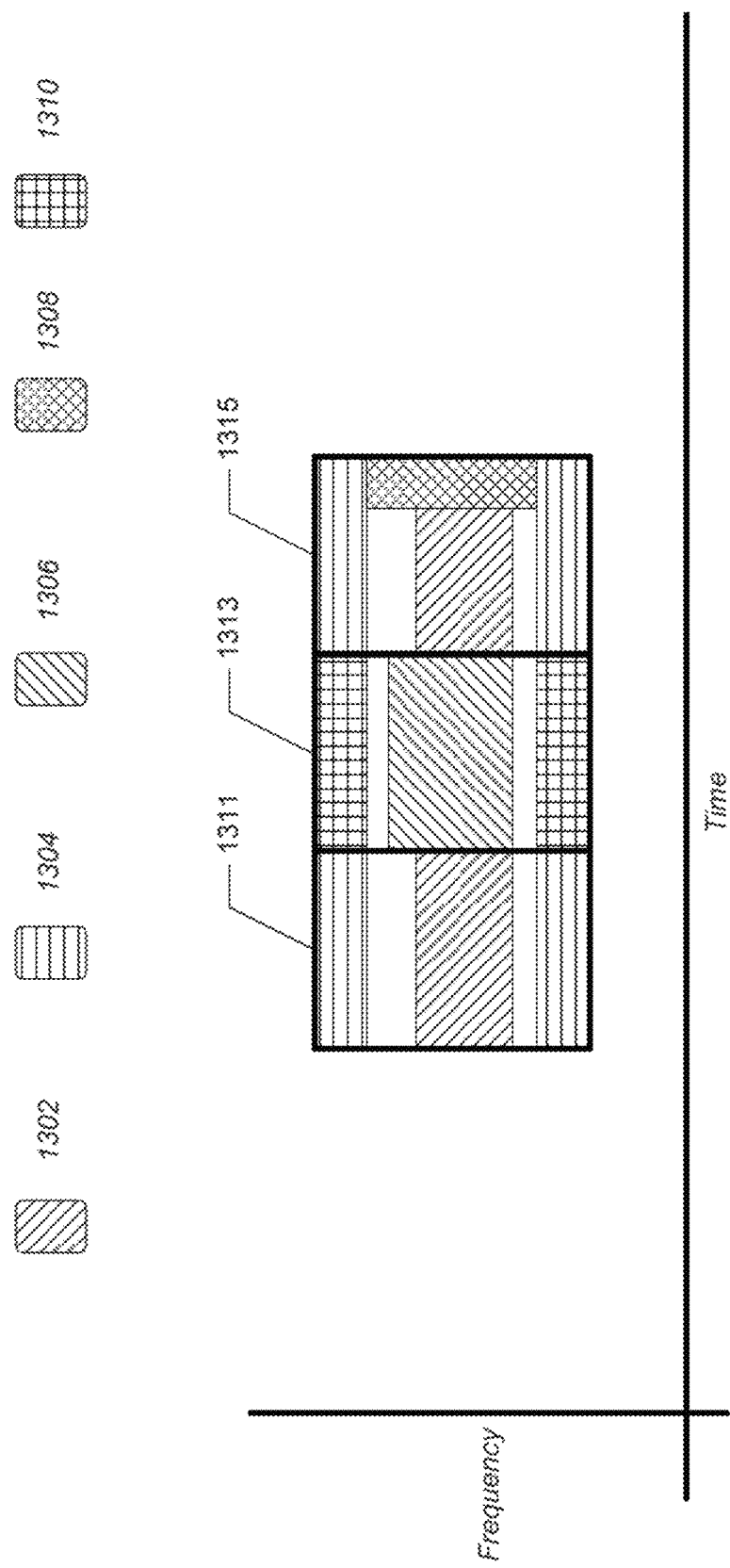
FIG. 13 illustrates an example sequence of subframes with NR mini-slot for TDM for NR NSA operation.

In some embodiments, in order to accommodate LTE resources that may be semi-statically reserved, such as SRS in a last symbol of a slot, a mini NR slot may be utilized to allow for the reserved symbols. FIG. 13 illustrates an example sequence of subframes with an NR mini-slot for TDM for NR NSA operations, according to some embodiments. As shown, subframe 1311 may include one or more frequency bands 1304 allocated for LTE PUCCH for a UE and a frequency band 1302 allocated for NR UL transmissions for the UE. Similarly, subframe 1313 may include one or more frequency bands 1310 allocated for LTE PUCCH for another UE and a frequency band 1306 allocated for LTE UL transmissions for the UE. In addition, subframe 1315 may include one or more frequency bands 1304 allocated for LTE PUCCH for a UE and a frequency band 1302 allocated for NR UL transmissions for the UE. In addition, subframe 1315 may include an allocation for a frequency band 1308 for SRS that overlaps with the frequency band allocated for NR UL transmissions, thus the NR UL transmission allocation may specify a mini NR slot that does not utilize all of subframe 1315.

In some embodiments, both network and UE may maintain multiple independent power control loop operating points. For example, for TDM on a common frequency, both RATs (e.g., LTE and NR) may share pathless estimation (which only depends on frequency) but link adaptation and channel coding may differ between the RATs, thus power control operating points may differ for the RATs. As another example, for TDM on different frequencies, each UL may have different pathloss and different link adaptation, thus power control operating points may differ for the RATs.

In some embodiments, UL timing advance may be dependent on a transmission frequency band. In other words, since LTE/NR UL may be transmitted on respective bands and different frequencies may have different channel propagation, it may be preferable that each RAT has independent timing control. Note that even if LTE/NR UL transmissions share the same band, beam forming for each RAT may change packet data protocol (PDP) as well. Thus, in some embodiments, if a UE is allocated resources such that LTE transmissions and NR transmissions are on respective bands and observed channel properties are not similar (e.g., PDP), the UE may follow respective timing controls. Alternatively, if observed channel properties are similar, LTE timing control may be followed if a UE is allocated resources such that LTE transmissions and NR transmissions are on an LTE band. On the other hand, if observed channel properties are similar and a UE is allocated resources such that LTE transmissions and NR transmissions are on an NR band, LTE transmissions may use LTE timing control and NR transmissions may follow NR timing control.

Figure 14:
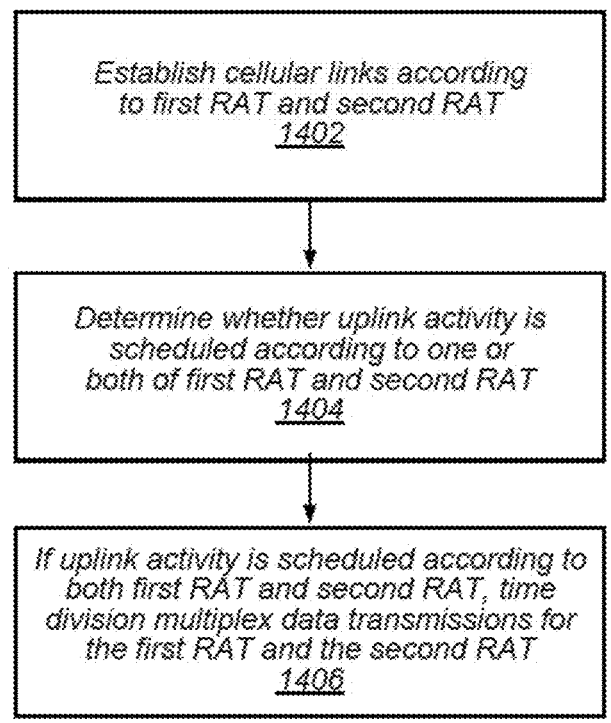
FIG. 14 illustrates a block diagram of an example of a method for using time division multiplexing (TDM) to support inter-RAT dual connectivity (DC), according to some embodiments.

FIG. 14 illustrates a block diagram of an example of a method for using time division multiplexing (TDM) to support inter-RAT dual connectivity (DC), according to some embodiments. The method shown in FIG. 14 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 1402, a wireless device, such as UE 106, may establish cellular links according to a first RAT and a second RAT. This may include attaching to a first base station that operates according to the first RAT, which may provide a first cell operating in a first system bandwidth (e.g., including a first carrier frequency). This may further include attaching to a second base station that operates according to the second RAT, which may provide a second cell operating in a second system bandwidth (e.g., including a second carrier frequency), which may be different than (e.g., non-overlapping with) the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR. For example, the first RAT may be NR and the second RAT may be LTE. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station.

In some embodiments, prior to transmitting the message, the wireless device may couple (e.g., via a switch) an uplink antenna to a transmit chain dedicated to LTE uplink transmissions, e.g., as described above in reference to FIG. 5. Alternatively, at least according to some embodiments, the wireless device may include sufficient uplink antennas that LTE and 5G NR uplink activities can be performed concurrently using separate antennas.

Continuing with the preceding example, in some instances the wireless device may transmit signaling to a 5G NR base station, such as gNB 604 described previously herein, to establish an attachment to a 5G NR network. In other words, the wireless device may request a connection with the 5G NR base station. In some embodiments, prior to transmitting the signaling, the wireless device may couple (e.g., via a switch) an uplink antenna to a transmit chain dedicated to 5G NR uplink transmissions, e.g., as described above in reference to FIG. 5. Alternatively, as previously noted, the wireless device may include sufficient uplink antennas that LTE and 5G NR uplink activities can be performed concurrently using separate antennas.

In some instances, the wireless device may receive an indication (e.g., from the LTE base station) that dual connectivity has been established. In other words, the wireless device may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

At 1404, the wireless device may determine whether one or both of the first RAT and the second RAT are scheduled to transmit at a given time (e.g., in the same subframe or slot, or otherwise in a temporally overlapping manner). The determination may be based on semi-static and/or dynamic scheduling indications from the first base station and/or the second base station. For example, in some instances, 5G NR operation may include time division duplexing between downlink and uplink slots, and indications may be provided of which slots are downlink slots and which slots are uplink slots. In LTE operation, certain resources may be semi-statically configured for control signaling. For example, certain resources may be set aside in an LTE uplink carrier for a LTE physical uplink control channel (PUCCH), a physical random access channel (PRACH), and/or sounding reference signals (SRS), e.g., as described above. Additionally, certain resources may be provided (e.g., dynamically scheduled by providing an uplink grant via downlink control information) for data communication, according to some embodiments.

Thus, as one possibility, the wireless device may receive an uplink scheduling grant for a first subframe for the first RAT, and may also receive an uplink scheduling grant for the first subframe for the second RAT, and may determine that the wireless device has uplink activity scheduled according to both the first RAT and the second RAT based on receiving the uplink scheduling grant for the first subframe for the first RAT and receiving the uplink scheduling grant for the first subframe for the second RAT. Alternatively, determination whether the wireless device has uplink activity scheduled according to both the first RAT and the second RAT may be performed by the network (e.g., by a master node of a gNB and a eNB, in some instances) and the wireless device may simply be scheduled for uplink activity on only one or the other RAT, or on both RATs, in accordance with uplink allocations provided by the network.

If uplink activity is scheduled according to only one or the other RAT, the uplink activity may be performed on the system bandwidth (e.g., on an uplink carrier frequency) associated with that RAT. Thus, the wireless device might perform uplink activity for the first RAT in the first system bandwidth if uplink activity is scheduled according to only the first RAT and might perform uplink activity for the second RAT in the second system bandwidth if uplink activity is scheduled according to only the second RAT.

However, if uplink activity is scheduled according to both first RAT and second RAT, at 1406, the wireless device may perform uplink activity for the first RAT and the second RAT using time division multiplexing (TDM) for data transmissions for the first RAT and the second RAT. In other words, the wireless device may not simultaneously transmit on the first RAT and the second RAT. Said another way, the wireless device may not be configured to transmit on the first RAT and the second RAT simultaneously. Thus, at least in some embodiments, the wireless device, may not be capable of supporting (and/or performing) simultaneous transmissions on the first RAT and the second RAT. In some embodiments, TDM for UL subframes may occur at a UL physical layer of the wireless device. In some embodiments, the TDM may be single carrier (e.g., occur on one of the first or second frequency bands) or multi-carrier.

In some embodiments, a first subframe may be allocated for UL transmissions according to the first RAT and a second subframe may be allocated for UL transmissions according to the second RAT. In some embodiments, each subframe may include an allocation for control signaling according to one of the first or second RAT. In some embodiments, DL subframes for the second RAT corresponding to subframes allocated for UL transmission according to the first RAT may be skipped (or muted) in order to maintain an ACK/NACK timeline of the second RAT. Alternatively, in some embodiments, ACK/NACKs for the second RAT may be multiplexed and/or bundled. In such embodiments, the bundled/multiplexed ACK/NACKs for the second RAT may be transmitted on either a subsequent UL subframe scheduled for the second RAT and/or a subsequent UL subframe scheduled for the first RAT (e.g., added to a payload of an UL transmission according to the first RAT).

Similarly, in some embodiments, the wireless device may receive a request from one of the base stations for aperiodic and/or periodic channel state information (CSI). In such embodiments, the wireless device may respond with a CSI report if the request was received in a DL subframe that corresponds to an UL subframe for which the wireless device is scheduled to transmit to the base station requesting the CSI report. For example, if the second base station requests the CSI report, then the wireless station may respond with the CSI report if it is received in a DL subframe that corresponds to an UL subframe for which the wireless device is scheduled to transmit to the second base station. In some embodiments, if the CSI report request is not received in a DL subframe that has a corresponding UL subframe (e.g., the CSI report is requested by the second base station but received in a DL subframe that has a corresponding UL subframe allocated for transmission to the first base station), the wireless station may delay transmission of the CSI report until a subsequent UL subframe that is scheduled for transmission to the requesting base station. Alternatively, the CSI report may be multiplexed in any UL subframe on a control payload. For example, if the second base station requests the CSI report in a DL subframe corresponding to an UL subframe allocated for transmission to the first base station, then the wireless station may multiplex the CSI report onto a payload of a control channel transmission to the first base station. In some embodiments, a region in the control channel of the first RAT may be reserved for CSI reporting for the second RAT.

In some embodiments, based, at least in part on a first frequency band allocation associated with the first RAT and a second frequency band allocation associated with the second RAT, the wireless device may determine that the wireless device does not support simultaneous uplink transmissions using the first and second frequency bands and the wireless device may indicate UL sharing (e.g., using a single frequency for transmissions to both the first and second base stations via TDM) to the first and/or second base station via a conditional field included in a wireless device capability message. In some embodiments, in addition to indicating wireless device UL sharing, the conditional field may further indicate which bands and/or frequencies that the wireless device supports NSA operations.

In some embodiments, e.g., as further described below, a wireless device using multiple frequencies to communicate to both the first and second base stations, may report a retuning time (e.g., in a capability message) and/or a radio frequency (RF) switching gap to the first and second base stations. The retuning time and/or RF switching gap may be an indication of a time period required by the wireless device to tune from a first frequency (e.g., used for uplink communications with the first base station) to a second frequency (e.g., used for uplink communications with the second base station). In some embodiments, a retuning time (and/or an RF switching gap) to tune from the first frequency to the second frequency may be different than a retuning time (and/or an RF switching gap) to tune from the second frequency to the first frequency. In some embodiments, the resolution of the retuning time (and/or an RF switching gap) may be on the order of symbols or multiple (e.g., "K") symbols. In some embodiments, the wireless device may provide binary information, e.g., no retuning time (and/or an RF switching gap) needed (e.g., multiple UL RF chains) or retuning time (and/or an RF switching gap) needed (e.g., shared UL RF chain). In such embodiments, a network may use a (pre-determined) retuning time/RF switching gap (e.g., "K" symbols as specified by a standard). In some embodiments, the network may configure a PUCCH format and mini-slot length for the wireless device to accommodate the retuning time (and/or an RF switching gap) reported by the wireless device. Thus, the network may configure (or schedule) transmissions on a per wireless device basis. In some embodiments, the wireless device may not report a retuning time (and/or an RF switching gap) and a network may assume (e.g., as specified in a standard) a "worst case" retuning time (and/or an RF switching gap) when configuring UL transmissions for a dual connectivity wireless device.

Figure 15A:
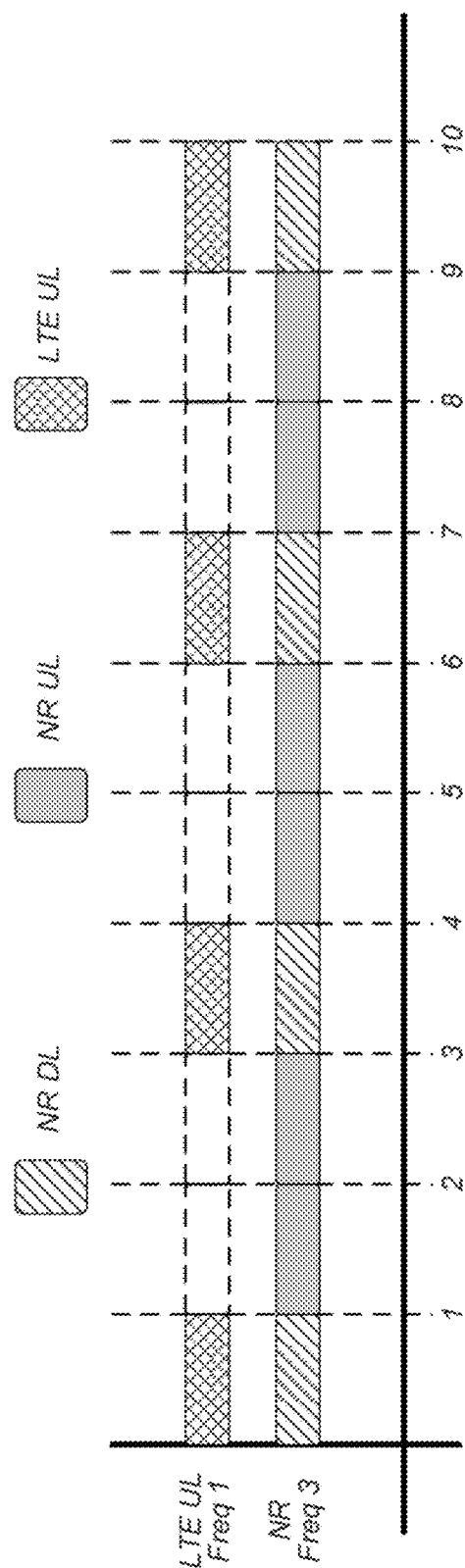
FIGS. 15A-B illustrate example uplink patterns for NR-LTE dual connectivity.
Figure 15B:
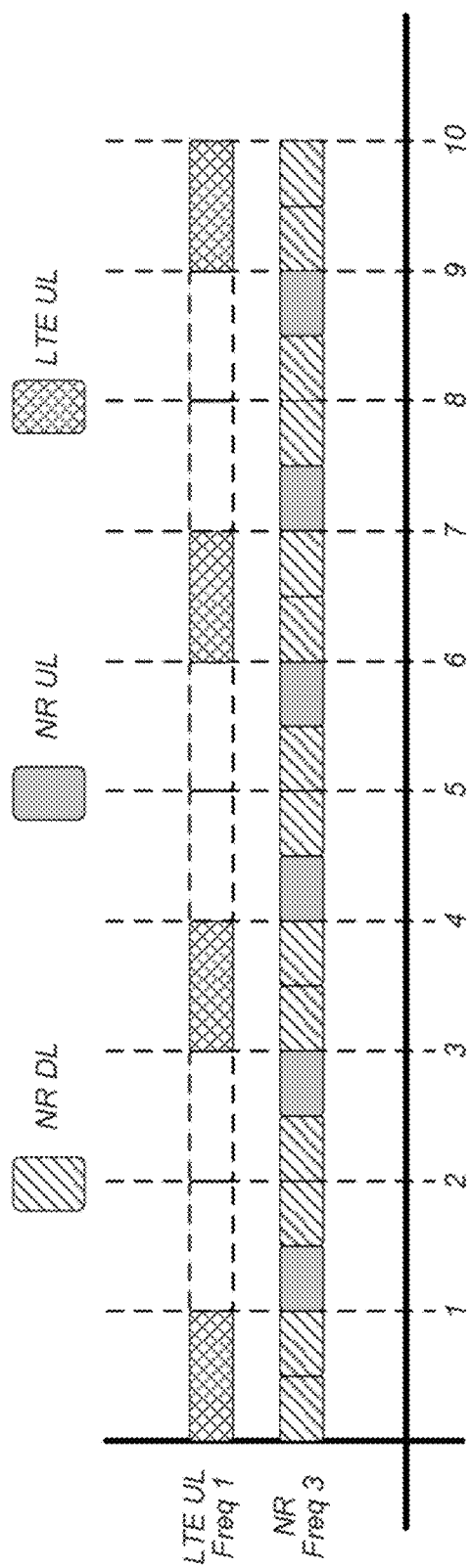

FIGS. 15A-B illustrate example uplink patterns for NR-LTE dual connectivity. The examples shown in FIGS. 15A-B may be applied to NR TDD spectrum, however, similar techniques may also be applied to NR FDD spectrum. In addition, the examples shown in FIGS. 15A-B exemplify NR-LTE dual connectivity, however, similar techniques may also be applied to NR-NR dual connectivity or carrier aggregation. In addition, different uplink patterns may also be used.

As illustrated in FIG. 15A, LTE and NR communications may be scheduled using the same numerology (e.g., 15 kHz subcarrier spacing). In other words, LTE and NR communications may be scheduled using the same subcarrier spacing. LTE uplink communications may occur on a first frequency (e.g., LTE UL Frequency 1) and NR communications (uplink and downlink) may occur on a second frequency (e.g., NR Frequency 3). As shown, NR downlink communications may coincide (or occur) in the same sub-frames as LTE UL communications (e.g., sub-frames 0, 3, 6, and 9) and NR uplink communications may occur in sub-frames in which LTE UL communications are not occurring (e.g., sub-frames 1, 2, 4, 5, 7, and 8). Thus, as shown, there is no spacing (e.g., additional NR DL sub-frames) separating LTE UL communications and NR UL communications.

As illustrated in FIG. 15B, LTE and NR communications may be scheduled using different numerologies (e.g., 15 KHz subcarrier spacing for LTE, 30 KHz subcarrier spacing for NR). In other words, LTE and NR communications may be scheduled using differing subcarrier spacing, e.g., NR subcarrier spacing may be a multiple of LTE subcarrier spacing. Similar to FIG. 15A, LTE uplink communications may occur on a first frequency (e.g., LTE UL Frequency 1) and NR communications (uplink and downlink) may occur on a second frequency (e.g., NR Frequency 3). As shown, NR uplink communications may occur in NR sub-frames directly preceding and/or directly subsequent to LTE UL sub-frames (e.g., LTE sub-frames 0, 3, 6, and 9 and NR sub-frames 2, 5, 8, 11, 14, and 17). Note that the remainder of the NR sub-frames may be used for NR downlink communications. Thus, as shown, there is no spacing (e.g., additional NR DL sub-frames) separating LTE UL communications and NR UL communications.

FIGS. 16A-B illustrate example uplink patterns for NR-LTE dual connectivity, according to some embodiments. The examples shown in FIGS. 16A-B may be applied to NR TDD spectrum, however, in some embodiments, similar techniques may also be applied to NR FDD spectrum. In addition, the examples shown in FIGS. 16A-B exemplify NR-LTE dual connectivity, however, in some embodiments, similar techniques may also be applied to NR-NR dual connectivity or NR carrier aggregation. In addition, in some embodiments, different uplink patterns may also be used.

As illustrated in FIG. 16A, LTE and NR communications may be scheduled using the same numerology (e.g., 15 kHz subcarrier spacing), according to some embodiments. In other words, LTE and NR communications may be scheduled using the same subcarrier spacing, in some embodiments. In some embodiments, LTE uplink communications may occur on a first frequency (e.g., LTE UL Frequency 1) and NR communications (uplink and downlink) may occur on a second frequency (e.g., NR Frequency 3). As shown, NR downlink communications may coincide (or occur) in the same sub-frames as LTE UL communications (e.g., sub-frames 0, 3, 6, and 9). In some embodiments, the NR uplink subframes may include one or more guard periods (e.g., guards 1 and 2). In some embodiments, the guard periods may be based (at least in part) on RF switching gaps (and/or retuning times) reported by a UE and/or specified by a standard based (at least in part) on a UE reporting a requirement for an RF switching gap (and/or retuning period). Thus, as shown, NR uplink sub-frames directly subsequent to LTE uplink sub-frames (e.g., sub-frames 1, 4, and 7) may include a guard period at a start of the sub-frame whereas NR uplink sub-frames directly preceding LTE uplink sub-frames (e.g., sub-frames 2, 5, and 8) may include a guard period at an end of the sub-frame. In other words, guard periods may occur between transitions from LTE uplink to NR uplink and NR uplink to LTE uplink.

As illustrated in FIG. 16B, LTE and NR communications may be scheduled using different numerologies (e.g., 15 KHz subcarrier spacing for LTE, 30 KHz subcarrier spacing for NR), according to some embodiments. In other words, LTE and NR communications may be scheduled using differing subcarrier spacing, e.g., NR subcarrier spacing may be a multiple of LTE subcarrier spacing, in some embodiments. In some embodiments, LTE uplink communications may occur on a first frequency (e.g., LTE UL Frequency 1) and NR communications (uplink and downlink) may occur on a second frequency (e.g., NR Frequency 3). As shown, NR uplink communications may occur in NR sub-frames directly preceding and/or directly subsequent to LTE UL sub-frames (e.g., LTE sub-frames 0, 3, 6, and 9 and NR sub-frames 2, 5, 8, 11, 14, and 17). Note that the remainder of the NR sub-frames may be used for NR downlink communications. In some embodiments, the NR uplink subframes may include one or more guard periods (e.g., guards 1 and 2). In some embodiments, the guard periods may be based (at least in part) on RF switching gaps (and/or retuning times) reported by a UE and/or specified by a standard based (at least in part) on a UE reporting a requirement for an RF switching gap (and/or retuning period). Thus, as shown, NR uplink sub-frames directly subsequent to LTE uplink sub-frames (e.g., sub-frames 3, 9, and 15) may include a guard period at a start of the sub-frame whereas NR uplink sub-frames directly preceding LTE uplink sub-frames (e.g., sub-frames 5, 11, and 17) may include a guard period at an end of the sub-frame. In other words, guard periods may occur between transitions from LTE uplink to NR uplink and NR uplink to LTE uplink.

Figure 17A:
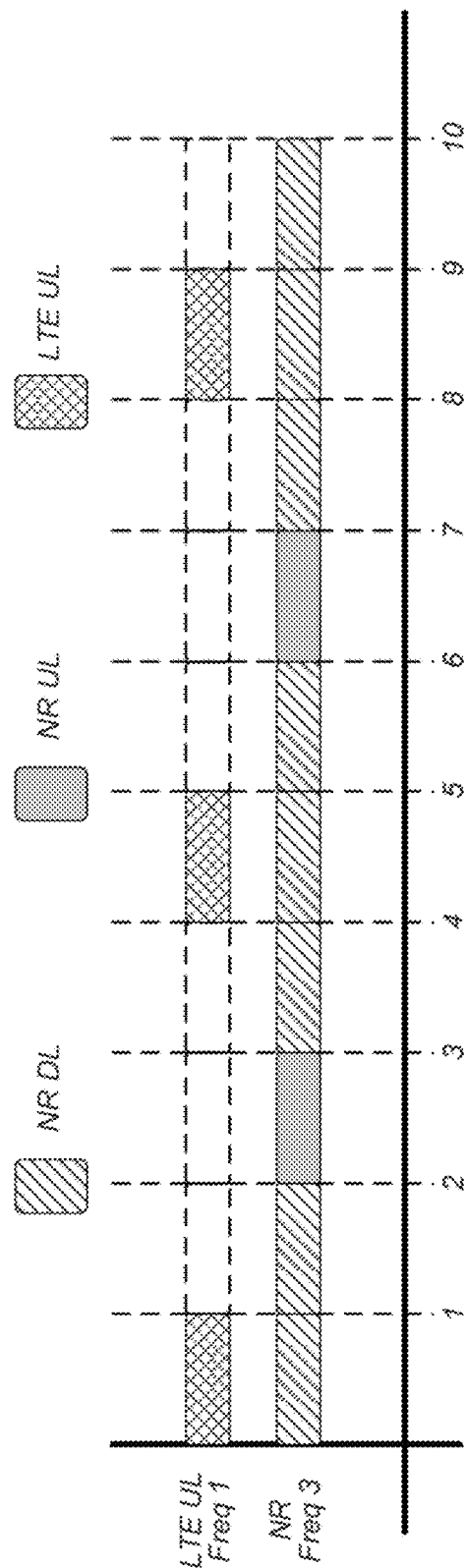
FIGS. 17A-B illustrate further example uplink patterns for NR-LTE dual connectivity, according to some embodiments.
Figure 17B:
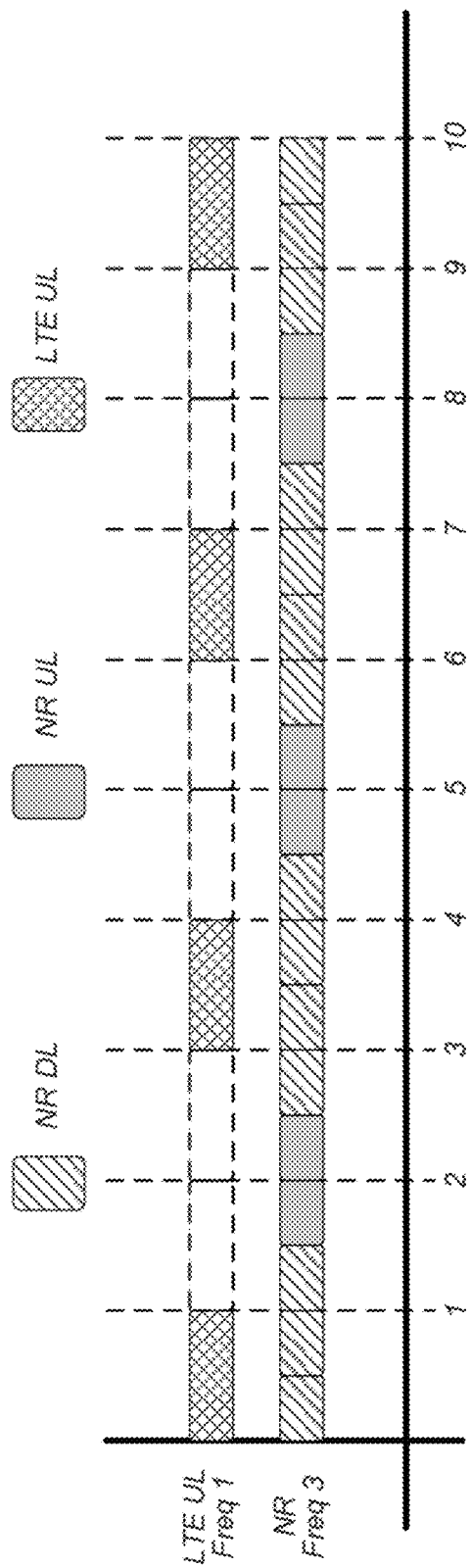

FIGS. 17A-B illustrate further example uplink patterns for NR-LTE dual connectivity, according to some embodiments. The examples shown in FIGS. 17A-B may be applied to NR TDD spectrum; however, in some embodiments, similar techniques may also be applied to NR FDD spectrum. In addition, the examples shown in FIGS. 16A-B exemplify NR-LTE dual connectivity; however, in some embodiments, similar techniques may also be applied to NR-NR dual connectivity or NR carrier aggregation. In addition, in some embodiments, different uplink patterns may also be used.

As illustrated in FIG. 17A, LTE and NR communications may be scheduled using the same numerology (e.g., 15 kHz subcarrier spacing), according to some embodiments. In other words, LTE and NR communications may be scheduled using the same subcarrier spacing, in some embodiments. In some embodiments, LTE uplink communications may occur on a first frequency (e.g., LTE UL Frequency 1) and NR communications (uplink and downlink) may occur on a second frequency (e.g., NR Frequency 3). As shown, a NR downlink sub-frame may separate LTE uplink and NR uplink communications. In some embodiments, the sub-frame separating the uplink communications may allow for a larger guard period between LTE uplink and NR uplink communications, e.g., to allow for a larger retuning time from/to LTE uplink frequency to/from NR uplink frequency. Note, that as compared to the example described above in reference to FIG. 16A (e.g., where the guard period is a portion of an NR sub-frame), the larger retuning time may result in a loss of UL opportunities. In some embodiments, the guard periods may be based (at least in part) on RF switching gaps (and/or retuning times) reported by a UE and/or specified by a standard based (at least in part) on a UE reporting a requirement for an RF switching gap (and/or retuning period). Thus, as shown, LTE uplink sub-frames may have a NR downlink sub-frame directly subsequent to the LTE uplink sub-frame and directly preceding LTE uplink sub-frames.

As illustrated in FIG. 17B, LTE and NR communications may be scheduled using different numerologies (e.g., 15 KHz subcarrier spacing for LTE, 30 KHz subcarrier spacing for NR), according to some embodiments. In other words, LTE and NR communications may be scheduled using differing subcarrier spacing, e.g., NR subcarrier spacing may be a multiple of LTE subcarrier spacing, in some embodiments. In some embodiments, LTE uplink communications may occur on a first frequency (e.g., LTE UL Frequency 1) and NR communications (uplink and downlink) may occur on a second frequency (e.g., NR Frequency 3). As shown, a NR downlink sub-frame may separate LTE uplink and NR uplink communications. In some embodiments, the sub-frame separating the uplink communications may allow for a larger guard period between LTE uplink and NR uplink communications, e.g., to allow for a larger retuning time from/to LTE uplink frequency to/from NR uplink frequency. Note, that as compared to the example described above in reference to FIG. 16B (e.g., where the guard period is a portion of an NR sub-frame), the larger retuning time may result in a loss of UL opportunities. In some embodiments, the guard periods may be based (at least in part) on RF switching gaps (and/or retuning times) reported by a UE and/or specified by a standard based (at least in part) on a UE reporting a requirement for an RF switching gap (and/or retuning period). Thus, as shown, LTE uplink sub-frames may have a NR downlink sub-frame directly subsequent to the LTE uplink sub-frame and directly preceding LTE uplink sub-frames.

Figure 18:
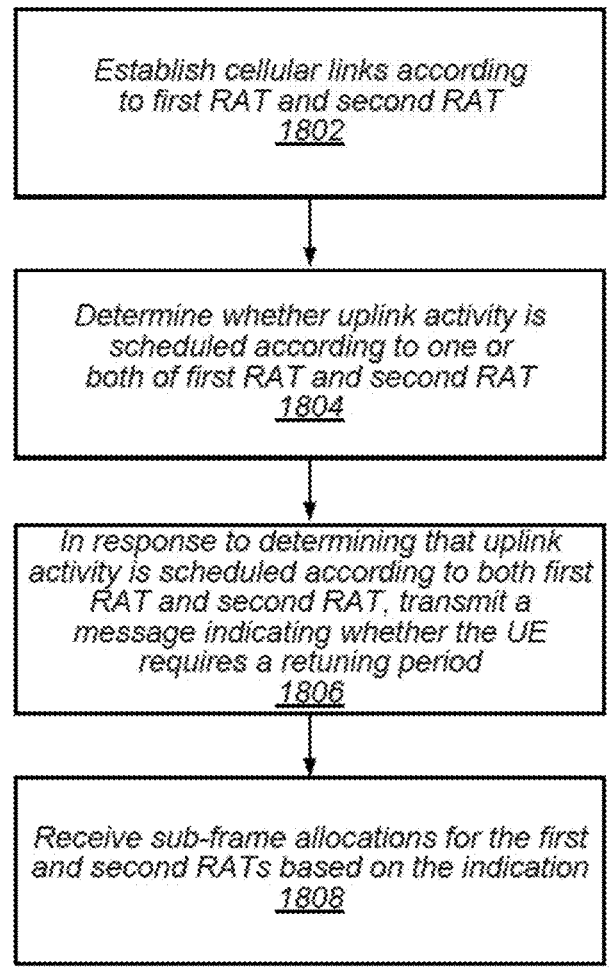
FIG. 18 illustrates a block diagram of an example of a method for using time division multiplexing (TDM) to support single carrier, multi-frequency inter-RAT dual connectivity (DC), according to some embodiments.

FIG. 18 illustrates a block diagram of an example of a method for using time division multiplexing (TDM) to support single carrier multi-frequency inter-RAT dual connectivity (DC), according to some embodiments. The method shown in FIG. 18 may be used in conjunction with any of the systems, techniques, or devices shown in the above Figures, among other techniques and devices. In various embodiments, some of the method elements shown may be performed concurrently, in a different order than shown, or may be omitted. Additional method elements may also be performed as desired. As shown, this method may operate as follows.

At 1802, a wireless device, such as UE 106, may establish cellular links according to a first RAT and a second RAT. This may include attaching to a first base station that operates according to the first RAT, which may provide a first cell operating in a first system bandwidth (e.g., including a first carrier frequency). This may further include attaching to a second base station that operates according to the second RAT, which may provide a second cell operating in a second system bandwidth (e.g., including a second carrier frequency), which may be different than (e.g., non-overlapping with) the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR. For example, the first RAT may be NR and the second RAT may be LTE. In some embodiments, both RATs may be NR. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station.

In some embodiments, prior to transmitting the message, the wireless device may couple (e.g., via a switch) an uplink antenna to a transmit chain dedicated to LTE uplink transmissions, e.g., as described above in reference to FIG. 5. Alternatively, at least according to some embodiments, the wireless device may include sufficient uplink antennas that LTE and 5G NR uplink activities can be performed concurrently using separate antennas.

Continuing with the preceding example, in some instances the wireless device may transmit signaling to a 5G NR base station, such as gNB 604 described previously herein, to establish an attachment to a 5G NR network. In other words, the wireless device may request a connection with the 5G NR base station. In some embodiments, prior to transmitting the signaling, the wireless device may couple (e.g., via a switch) an uplink antenna to a transmit chain dedicated to 5G NR uplink transmissions, e.g., as described above in reference to FIG. 5. Alternatively, as previously noted, the wireless device may include sufficient uplink antennas that LTE and 5G NR uplink activities can be performed concurrently using separate antennas.

In some instances, the wireless device may receive an indication (e.g., from the LTE base station) that dual connectivity has been established. In other words, the wireless device may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

At 1804, the wireless device may determine whether one or both of the first RAT and the second RAT are scheduled to transmit at a given time (e.g., in the same subframe or slot, or otherwise in a temporally overlapping manner). The determination may be based on semi-static and/or dynamic scheduling indications from the first base station and/or the second base station. For example, in some instances, 5G NR operation may include time division duplexing between downlink and uplink slots, and indications may be provided of which slots are downlink slots and which slots are uplink slots. In LTE operation, certain resources may be semi-statically configured for control signaling. For example, certain resources may be set aside in an LTE uplink carrier for a LTE physical uplink control channel (PUCCH), a physical random access channel (PRACH), and/or sounding reference signals (SRS), e.g., as described above. Additionally, certain resources may be provided (e.g., dynamically scheduled by providing an uplink grant via downlink control information) for data communication, according to some embodiments.

Thus, as one possibility, the wireless device may receive an uplink scheduling grant for a first subframe for the first RAT, and may also receive an uplink scheduling grant for the first subframe for the second RAT, and may determine that the wireless device has uplink activity scheduled according to both the first RAT and the second RAT based on receiving the uplink scheduling grant for the first subframe for the first RAT and receiving the uplink scheduling grant for the first subframe for the second RAT. Alternatively, determination whether the wireless device has uplink activity scheduled according to both the first RAT and the second RAT may be performed by the network (e.g., by a master node of a gNB and a eNB, in some instances) and the wireless device may simply be scheduled for uplink activity on only one or the other RAT, or on both RATs, in accordance with uplink allocations provided by the network.

If uplink activity is scheduled according to only one or the other RAT, the uplink activity may be performed on the system bandwidth (e.g., on an uplink carrier frequency) associated with that RAT. Thus, the wireless device might perform uplink activity for the first RAT in the first system bandwidth if uplink activity is scheduled according to only the first RAT and might perform uplink activity for the second RAT in the second system bandwidth if uplink activity is scheduled according to only the second RAT.

However, if uplink activity is scheduled according to both first RAT and second RAT, at 1806, the wireless device may transmit a message indicating whether the wireless device requires a retuning period and/or RF switching gap, e.g., as described above in reference to FIGS. 16A-B and 17A-B. In some embodiments, the retuning period (or retuning time and/or RF switching gap) may be reported (or indicated) in a capability message. In some embodiments, the retuning time and/or RF switching gap may be an indication of a time period required by the wireless device to tune from a first frequency (e.g., used for uplink communications with the first base station) to a second frequency (e.g., used for uplink communications with the second base station). In some embodiments, a retuning time and/or RF switching gap to tune from the first frequency to the second frequency may be different than a retuning time and/or RF switching gap to tune from the second frequency to the first frequency. In some embodiments, the resolution of the retuning time and/or RF switching gap may be on the order of symbols or multiple (e.g., "K") symbols. In some embodiments, the wireless device may provide binary information, e.g., no retuning time and/or RF switching gap needed (e.g., multiple UL RF chains) or retuning time and/or RF switching gap needed (e.g., shared UL RF chain). In such embodiments, a network may use a retuning time and/or RF switching gap as specified by a standard (e.g., less than or equal to "K" symbols). In some embodiments, the network may configure a PUCCH format and mini-slot length for the wireless device to accommodate the retuning time and/or RF switching gap reported by the wireless device. Thus, the network may configure (or schedule) transmissions on a per wireless device basis. In some embodiments, the wireless device may not report a retuning time and/or RF switching gap and a network may assume (e.g., as specified in a standard) a "worst case" retuning time when configuring UL transmissions for a dual connectivity wireless device.

At 1808, the wireless device may receive sub-frame allocations for the first and second RATs based (at least in part) on the indication transmitted by the wireless device. In some embodiments, based, at least in part on a first frequency band allocation associated with the first RAT and a second frequency band allocation associated with the second RAT, the wireless device may determine that the wireless device does not support uplink transmissions using the first and second frequency bands and the wireless device may indicate UL sharing (e.g., using a single frequency for transmissions to both the first and second base stations via TDM) to the first and/or second base station via a conditional field included in a wireless device capability message. In some embodiments, in addition to indicating wireless device UL sharing, the conditional field may further indicate which bands and/or frequencies that the wireless device supports NSA operations.

In some embodiments, the allocation may include one or more guard periods based, at least in part, on the indication received from the wireless device. In other words, the guard periods may be based (at least in part) on retuning times and/or RF switching gaps reported by the wireless device and/or specified by a standard based (at least in part) on the wireless device reporting a requirement for a retuning period and/or RF switching gap. In some embodiments, uplink sub-frames allocated for the first RAT and directly subsequent to uplink sub-frames allocated for the second RAT may include a guard period at a start of the sub-frame whereas uplink sub-frames allocated for the first RAT directly preceding uplink sub-frames allocated for the second RAT may include a guard period at an end of the sub-frame. In other words, guard periods may occur between transitions from uplink sub-frames allocated for the second RAT to uplink sub-frames allocated for the first RAT and between transitions from uplink sub-frames allocated for the first RAT to uplink sub-frames allocated for the second RAT.

In some embodiments, the one or more guard periods may include downlink sub-frame allocated for the first RAT separating sub-frames allocated for the second RAT to uplink sub-frames allocated for the first RAT. For example, uplink sub-frames allocated for the second RAT may have a downlink sub-frame allocated for the first RAT directly subsequent to the uplink sub-frame allocated for the second RAT and directly preceding uplink sub-frames allocated for the second RAT.

In some embodiments, the wireless device may perform uplink activity for the first RAT and the second RAT using time division multiplexing (TDM) for data transmissions for the first RAT and the second RAT. In other words, the wireless device may not simultaneously transmit on the first RAT and the second RAT. Said another way, the wireless device may not be configured to transmit on the first RAT and the second RAT simultaneously. Thus, at least in some embodiments, the wireless device, may not be capable of supporting (and/or performing) simultaneous transmissions on the first RAT and the second RAT. In some embodiments, TDM for UL subframes may occur at a UL physical layer of the wireless device. In some embodiments, the TDM may be single carrier (e.g., occur on one of the first or second frequency bands) or multi-carrier.

In some embodiments, a first subframe may be allocated for UL transmissions according to the first RAT and a second subframe may be allocated for UL transmissions according to the second RAT. In some embodiments, each subframe may include an allocation for control signaling according to one of the first or second RAT. In some embodiments, DL subframes for the second RAT corresponding to subframes allocated for UL transmission according to the first RAT may be skipped (or muted) in order to maintain an ACK/NACK timeline of the second RAT. Alternatively, in some embodiments, ACK/NACKs for the second RAT may be multiplexed and/or bundled. In such embodiments, the bundled/multiplexed ACK/NACKs for the second RAT may be transmitted on either a subsequent UL subframe scheduled for the second RAT and/or a subsequent UL subframe scheduled for the first RAT (e.g., added to a payload of an UL transmission according to the first RAT).

Similarly, in some embodiments, the wireless device may receive a request from one of the base stations for aperiodic and/or periodic channel state information (CSI). In such embodiments, the wireless device may respond with a CSI report if the request was received in a DL subframe that corresponds to an UL subframe for which the wireless device is scheduled to transmit to the base station requesting the CSI report. For example, if the second base station requests the CSI report, then the wireless station may respond with the CSI report if it is received in a DL subframe that corresponds to an UL subframe for which the wireless device is scheduled to transmit to the second base station. In some embodiments, if the CSI report request is not received in a DL subframe that has a corresponding UL subframe (e.g., the CSI report is requested by the second base station but received in a DL subframe that has a corresponding UL subframe allocated for transmission to the first base station), the wireless station may delay transmission of the CSI report until a subsequent UL subframe that is scheduled for transmission to the requesting base station. Alternatively, the CSI report may be multiplexed in any UL subframe on a control payload. For example, if the second base station requests the CSI report in a DL subframe corresponding to an UL subframe allocated for transmission to the first base station, then the wireless station may multiplex the CSI report onto a payload of a control channel transmission to the first base station. In some embodiments, a region in the control channel of the first RAT may be reserved for CSI reporting for the second RAT.

Further Embodiments

In some embodiments, a wireless device (e.g., such as UE 106) may perform a method for inter-RAT dual connectivity. In some embodiments, the wireless device, e.g., such as UE 106, may include at least an antenna, a radio coupled to (and/or in communication with) the antenna, and a processing element coupled to (and/or in communication with) the radio. In some embodiments, the method may include program instructions executable by the processing element (and/or processing circuitry) of the wireless device. In some embodiments, the method may include establishing a first wireless link with a first cell according to a first radio access technology (RAT), wherein the first cell operates in a first system bandwidth; establishing a second wireless link with a second cell according to a second radio access technology (RAT), wherein the second cell operates in a second system bandwidth; determining whether the wireless device has uplink activity scheduled according to both the first RAT and the second RAT; and performing uplink activity for both the first RAT and the second RAT by time division multiplexing (TDM) uplink data for the first RAT and uplink data for the second RAT if uplink activity is scheduled according to both the first RAT and the second RAT. In other words, the wireless device may not simultaneously transmit on the first RAT and the second RAT. Said another way, the wireless device may not be configured to transmit on the first RAT and the second RAT simultaneously. Thus, at least in some embodiments, the wireless device, may not be capable of supporting (and/or performing) simultaneous transmissions on the first RAT and the second RAT.

In some embodiments, performing uplink activity for both the first RAT and the second RAT by time division multiplexing (TDM) uplink data for the first RAT and uplink data for the second RAT if uplink activity is scheduled according to both the first RAT and the second RAT may further include receiving an allocation of a first UL subframe for transmissions according to the first RAT; and receiving an allocation of a second UL subframe for transmissions according to the second RAT.

In some embodiments, the TDM of the uplink data may be performed at a physical layer of the wireless device.

In some embodiments, the method may also include the wireless device receiving an allocation of a portion of each UL subframe for control signaling according to one of the first or second RATs.

In some embodiments, the method may also include the wireless device receiving, from the second base station, a request for channel state information in a downlink subframe; determining that the downlink subframe does not correspond to an UL subframe scheduled for transmission to the second base station; and multiplexing channel state information regarding the second base station in a control signal transmitted to the first base station in the UL subframe.

In some embodiments, the method may also include the wireless device receiving, from the second base station, an allocation of uplink subframes, wherein the allocation indicates uplink subframes for transmission to the first base station and uplink subframes for allocation to the second base station; and receiving, from the second base station, an allocation of downlink subframes, wherein the allocation of downlink subframes corresponds to an allocation of uplink subframes such that the wireless device only receives data from the second base station in downlink subframes that correspond to uplink subframes allocated for transmission to the second base station, thereby maintaining an acknowledgment timeline according to the second RAT.

In some embodiments, the method may also include the wireless device receiving, from the second base station, an allocation of uplink subframes, wherein the allocation indicates uplink subframes for transmission to the first base station and uplink subframes for allocation to the second base station; receiving, from the second base station, an allocation of downlink subframes, wherein the allocation indicates the wireless device will receive downlink data in all downlink subframes; multiplexing acknowledgment of the downlink subframes; and transmitting the multiplexed acknowledgments in an uplink subframe, thereby maintaining an acknowledgment timeline according to the second RAT. In some embodiments, the transmitting may occur in an uplink subframe allocated for transmission to the second base station. In some embodiments, the transmitting may occur in an uplink subframe allocated for transmission to the first base station, wherein the multiplexed acknowledgments are included in a payload of a control channel transmission to the first base station.

In some embodiments, the method may also include the wireless device receiving, from the second base station, an allocation of uplink subframes, wherein the allocation indicates uplink subframes for transmission to the first base station and uplink subframes for allocation to the second base station; receiving, from the second base station, an allocation of downlink subframes, wherein the allocation indicates the wireless device will receive downlink data in all downlink subframes; bundling acknowledgment of the downlink subframes; and transmitting the bundled acknowledgments in an uplink subframe, thereby maintaining an acknowledgment timeline according to the second RAT. In some embodiments, the transmitting may occur in an uplink subframe allocated for transmission to the second base station. In some embodiments, the transmitting may occur in an uplink subframe allocated for transmission to the first base station, wherein the bundled acknowledgments are included in a payload of a control channel transmission to the first base station.

In some embodiments, the method may also include the wireless device receiving, from one of the first or second base stations, an allocation of a first frequency band associated with the first RAT and a second frequency band associated with the second RAT, wherein the first and second frequency bands are equivalent.

In some embodiments, the method may also include the wireless device receiving, from one of the first or second base stations, an allocation of a first frequency band associated with the first RAT and a second frequency band associated with the second RAT, wherein the first and second frequency bands are not equivalent.

In some embodiments, the first RAT may comprise 5G NR, and the second RAT may comprise LTE.

In some embodiments, the method may also include the wireless device receiving, from one of the first or second base stations, an allocation of a first frequency band associated with the first RAT and a second frequency band associated with the second RAT, wherein the first and second frequency bands are equivalent.

In some embodiments, the method may also include the wireless device receiving, from one of the first or second base stations, an allocation of a first frequency band associated with the first RAT and a second frequency band associated with the second RAT, wherein the first and second frequency bands are not equivalent.

In some embodiments, the method may also include the wireless device receiving, from one of the first or second base stations, an allocation of a first frequency band associated with the first RAT and a second frequency band associated with the second RAT; determining, based in part on the first and second frequency bands, that the wireless device does not support simultaneous uplink transmissions using the first and second frequency bands; and transmitting an indication that the wireless device supports UL sharing for one of the first or second frequency bands to one of the first or second base stations. In some embodiments, the indication may be included in a conditional field of a capability message. In some embodiments, the conditional field may further include an indication for which bands and/or frequency combinations the wireless device supports UL sharing.

In some embodiments, the method may also include the wireless device reporting, to the first and/or second base station, an indication of a required radio frequency (RF) switching gap and/or retuning time, wherein the retuning time and/or switching gap and/or retuning time is associated with one or more time periods required to switch an RF operating frequency from a first frequency to a second frequency and/or from the second frequency to the first frequency, wherein the first frequency is used for transmitting communications to the first base station, wherein the second frequency is used for transmitting communications to the second base station; and receiving, in response to the reporting, sub-frame allocations for communications with the first and second base stations, wherein the sub-frame allocations are based, at least in part, on the indication.

In some embodiments, a wireless device (e.g., such as UE 106) may perform a method for inter-RAT dual connectivity.

In some embodiments, the wireless device, e.g., such as UE 106, may include at least an antenna, a radio coupled to (and/or in communication with) the antenna, and a processing element coupled to (and/or in communication with) the radio. In some embodiments, the method may include program instructions executable by the processing element (and/or processing circuitry) of the wireless device. In some embodiments, the method may include establishing a first wireless link with a first cell according to a first radio access technology (RAT), wherein the first cell operates in a first system bandwidth; establishing a second wireless link with a second cell according to a second radio access technology (RAT), wherein the second cell operates in a second system bandwidth; in response to determining that the wireless device has uplink activity scheduled according to both the first RAT and the second RAT, transmitting an indication of a required radio frequency (RF) switching gap and/or retuning time between different frequencies; and receiving sub-frame allocations for the first cell and the second cell based, at least in part, on the indication.

In some embodiments, the required retuning time and/or RF switching gap may be associated with one or more time periods required by the wireless device to switch from a first frequency to a second frequency and/or from the second frequency to the first frequency. In some embodiments, the first frequency may be used for transmitting communications to the first base station and the second frequency may be used for transmitting communications to the second base station. In some embodiments, a first time period to switch from the first frequency to the second frequency may be different than a second time period to switch from the second frequency to the first frequency.

In some embodiments, the indication may indicate whether the retuning time and/or RF switching gap is needed (and/or required). In some embodiments, the indication may indicate that no retuning time and/or RF switching gap is needed (and/or required).

In some embodiments, the retuning time and/or RF switching gap may be specified as one of a portion of a downlink sub-frame allocated for the first cell and/or at least one downlink sub-frame allocated for the first cell. In some embodiments, the retuning time and/or RF switching gap may be specified via a standard. In some embodiments, the retuning time and/or RF switching gap may be specified on the order of symbols. In some embodiments, the retuning time and/or RF switching gap may be specified on the order of multiple symbols.

In some embodiments, the allocations may include a first guard period at a start of sub-frames allocated for transmissions to the first cell directly subsequent to sub-frames allocated for transmissions to the second cell. In some embodiments, the first guard period may be associated with the required tuning time. In some embodiments, the allocations may include a second guard period at an end of sub-frames allocated for transmissions to the first cell directly preceding sub-frames allocated for transmissions to the second cell. In some embodiments, the second guard period may be associated with the required tuning time. In some embodiments, the allocations may include a sub-frame allocated for receiving transmissions from the first cell between a sub-frame allocated for transmissions to the second cell and a sub-frame allocated for transmissions to the first cell. In some embodiments, the allocations may include a sub-frame allocated for receiving transmissions from the first cell between a sub-frame allocated for transmissions to the first cell and a sub-frame allocated for transmissions to the second cell.

In some embodiments, the method may also include the wireless device performing uplink activity for both the first RAT and the second RAT by time division multiplexing (TDM) uplink data for the first RAT and uplink data for the second RAT if uplink activity is scheduled according to both the first RAT and the second RAT. In other words, the wireless device may not simultaneously transmit on the first RAT and the second RAT. Said another way, the wireless device may not be configured to transmit on the first RAT and the second RAT simultaneously. Thus, at least in some embodiments, the wireless device, may not be capable of supporting (and/or performing) simultaneous transmissions on the first RAT and the second RAT.

In some embodiments, performing uplink activity for both the first RAT and the second RAT by time division multiplexing (TDM) uplink data for the first RAT and uplink data for the second RAT if uplink activity scheduled according to both the first RAT and the second RAT may include receiving an allocation of a first UL subframe for transmissions according to the first RAT and receiving an allocation of a second UL subframe for transmissions according to the second RAT. In some embodiments, the TDM of the uplink data may be performed at a physical layer of the wireless device.

In some embodiments, the method may further include the wireless device receiving an allocation of a portion of each UL subframe for control signaling according to one of the first or second RATs.

In some embodiments, the method may further include the wireless device receiving, from the second base station, a request for channel state information in a downlink subframe; determining that the downlink subframe does not correspond to an UL subframe scheduled for transmission to the second base station; and multiplexing channel state information regarding the second base station in a control signal transmitted to the first base station in the UL subframe.

In some embodiments, the method may further include the wireless device receiving, from the second base station, an allocation of downlink subframes. In some embodiments, the allocation of downlink subframes may correspond to an allocation of uplink subframes such that the wireless device only receives data from the second base station in downlink subframes that correspond to uplink subframes allocated for transmission to the second base station, thereby maintaining an acknowledgment timeline according to the second RAT.

In some embodiments, the method may further include the wireless device receiving, from the second base station, an allocation of downlink subframes; multiplexing acknowledgment of the downlink subframes; and transmitting the multiplexed acknowledgments in an uplink subframe, thereby maintaining an acknowledgment timeline according to the second RAT. In some embodiments, the allocation may indicate the wireless device will receive downlink data in all downlink subframes. In some embodiments, transmitting the multiplexed acknowledgements in an uplink subframe may occur in an uplink subframe allocated for transmission to the second base station. In some embodiments, transmitting the multiplexed acknowledgements in an uplink subframe may occur an uplink subframe allocated for transmission to the first base station, wherein the multiplexed acknowledgments are included in a payload of a control channel transmission to the first base station.

In some embodiments, the method may further include the wireless device receiving, from the second base station, an allocation of downlink subframes; bundling acknowledgment of the downlink subframes; and transmitting the bundled acknowledgments in an uplink subframe, thereby maintaining an acknowledgment timeline according to the second RAT. In some embodiments, the allocation may indicate the wireless device will receive downlink data in all downlink subframes. In some embodiments, transmitting the bundled acknowledgments in an uplink subframe may occur in an uplink subframe allocated for transmission to the second base station. In some embodiments, transmitting the bundled acknowledgments in an uplink subframe may occur in an uplink subframe allocated for transmission to the first base station, wherein the bundled acknowledgments are included in a payload of a control channel transmission to the first base station.

In some embodiments, receiving sub-frame allocations for the first cell and the second cell based, at least in part, on the indication may include receiving, from one of the first or second base stations, an allocation of a first frequency band associated with the first RAT and a second frequency band associated with the second RAT. In some embodiments, the first and second frequency bands may not be not equivalent. In some embodiments, such a method may further include the wireless device determining, based in part on the first and second frequency bands, that the wireless device does not support uplink transmissions using the first and second frequency bands and transmitting an indication for which bands and/or frequency combinations that the wireless device supports uplink sharing to one of the first or second base stations. In some embodiments, the indication may be included in a conditional field of a capability message.

In some embodiments, the first RAT may be 5G NR and the second RAT may be LTE. In some embodiments, the first RAT may be 5G NR and the second RAT may be 5G NR.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using a first radio access technology (RAT);
one or more processors coupled to the at least one radio, wherein the one or more processors and the at least one radio are configured to perform voice and/or data communications;
wherein the one or more processors are configured to cause the UE to:
    transmit a first capability indicating support of uplink (UL) sharing for one or more system bandwidths in a dual connectivity configuration with the first RAT and a second RAT;
    transmit a second capability indicating binary information indicating one of no switching gap needed and switching gap needed; and
    receive an allocation of first UL resources associated with a first cell using the first RAT, wherein the allocation of first UL resources is in accordance with time division multiplexing (TDM) for UL data transmissions for the first RAT and the second RAT.

2. The UE of claim 1,
wherein the first cell operates in a first system bandwidth, and wherein a second cell using the second RAT operates in a second system bandwidth, wherein the first and second system bandwidths are at least partially overlapping.

3. The UE of claim 1,
wherein the first capability indicating support of UL sharing is reported for a band combination.

4. The UE of claim 1,
wherein the switching gap includes a retuning time, wherein the retuning time is a time period required by the UE to tune from a first frequency for the first cell to a second frequency for a second cell.

5. The UE of claim 1,
wherein the switching gap is specified as less than a pre-determined time specified by a standard.

6. The UE of claim 1,
wherein the allocation of first UL resources is based, at least in part, on the UE not supporting simultaneous uplink transmissions on the first and second RATs in dual connectivity.

7. The UE of claim 1,
wherein the first RAT comprises at least one of Fifth Generation New Radio (5G NR) or Long Term Evolution (LTE) and the second RAT comprises the other one of LTE and 5G NR.

8. The UE of claim 1,
wherein the allocation of first UL resources includes one or more of:
    a first guard period at an end of sub-frames allocated for transmissions to the first cell directly preceding sub-frames allocated for transmissions to a second cell using the second RAT; and
    a second guard period at a start of sub-frames allocated for transmissions to the first cell directly subsequent to sub-frames allocated for transmissions to the second cell, wherein one or more of the first and second guard periods are associated with the switching gap.

9. An apparatus, comprising:
a memory; and
at least one processor in communication with the memory;
wherein the at least one processor is configured to:
- transmit a first capability indicating that a user equipment device (UE) supports uplink (UL) sharing for one or more system bandwidths in a dual connectivity configuration with a first radio access technology (RAT) and a second RAT;
- transmit a second capability indicating binary information indicating one of no switching gap needed and switching gap needed; and
- receive an allocation of first UL resources associated with a first cell using the first RAT, wherein the allocation of first UL resources is in accordance with time division multiplexing (TDM) for UL data transmissions for the first RAT and the second RAT.

10. The apparatus of claim 9,
wherein the first cell operates in a first system bandwidth, and wherein a second cell using the second RAT operates in a second system bandwidth, wherein the first and second system bandwidths are at least partially overlapping.

11. The apparatus of claim 9,
wherein the first capability indicating that the UE supports UL sharing is reported for a band combination.

12. The apparatus of claim 9,
wherein the switching gap includes a retuning time, wherein the retuning time is a time period required by the UE to tune from a first frequency for the first cell to a second frequency for a second cell.

13. The apparatus of claim 9,
wherein the switching gap is specified as less than a pre-determined time specified by a standard.

14. The apparatus of claim 9,
wherein the allocation of first UL resources is based, at least in part, on the apparatus not supporting simultaneous uplink transmissions on the first and second RATs in dual connectivity.

15. The apparatus of claim 9,
wherein the allocation of first UL resources includes one or more of:
- a first guard period at an end of sub-frames allocated for transmissions to the first cell directly preceding sub-frames allocated for transmissions to a second cell using the second RAT; and
- a second guard period at a start of sub-frames allocated for transmissions to the first cell directly subsequent to sub-frames allocated for transmissions to the second cell, wherein one or more of the first and second guard periods are associated with the switching gap.

16. A non-transitory computer readable memory medium storing program instructions executable by processing circuitry to cause a user equipment device (UE) to:
- transmit a first capability indicating support of uplink (UL) sharing for one or more system bandwidths in a dual connectivity configuration with a first radio access technology (RAT) and a second RAT;
- transmit a second capability indicating binary information indicating one of no switching gap needed and switching gap needed; and
- receive an allocation of first UL resources associated with a first cell using the first RAT, wherein the allocation of first UL resources is in accordance with time division multiplexing (TDM) for UL data transmissions for the first RAT and the second RAT.

17. The non-transitory computer readable memory medium of claim 16,
wherein the first cell operates in a first system bandwidth, and wherein a second cell using the second RAT operates in a second system bandwidth, wherein the first and second system bandwidths are at least partially overlapping.

18. The non-transitory computer readable memory medium of claim 16,
wherein the first capability indicating support of UL sharing is reported for a band combination.

19. The non-transitory computer readable memory medium of claim 16,
wherein the switching gap includes a retuning time, wherein the retuning time is a time period required by the UE to tune from a first frequency for the first cell to a second frequency for a second cell.

20. The non-transitory computer readable memory medium of claim 16,
wherein the switching gap is specified as less than a pre-determined time specified by a standard.

* * * * *